(12) United States Patent
Yang et al.

(10) Patent No.: US 10,278,141 B2
(45) Date of Patent: Apr. 30, 2019

(54) METHOD FOR TRANSMITTING UPLINK SIGNAL AND USER EQUIPMENT, AND METHOD FOR RECEIVING UPLINK SIGNAL AND BASE STATION

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,013

(22) PCT Filed: Aug. 6, 2015

(86) PCT No.: PCT/KR2015/008243
§ 371 (c)(1),
(2) Date: Jan. 12, 2017

(87) PCT Pub. No.: WO2016/021954
PCT Pub. Date: Feb. 11, 2016

(65) Prior Publication Data
US 2017/0215172 A1  Jul. 27, 2017

Related U.S. Application Data

(60) Provisional application No. 62/033,663, filed on Aug. 6, 2014, provisional application No. 62/046,186, filed (Continued)

(51) Int. Cl.
*H04W 4/00* (2018.01)
*H04W 52/36* (2009.01)
(Continued)

(52) U.S. Cl.
CPC ........ *H04W 52/367* (2013.01); *H04B 7/0626* (2013.01); *H04B 7/26* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 8,582,638 B2  11/2013  Earnshaw et al.
8,688,163 B2   4/2014  Chen et al.
(Continued)

FOREIGN PATENT DOCUMENTS

JP  2013102398     5/2013
KR  1020140010450  1/2014
(Continued)

OTHER PUBLICATIONS

European Patent Office Application Serial No. 15829913.1, Search Report dated Feb. 15, 2018, 11 pages.
(Continued)

*Primary Examiner* — Siren Wei
(74) *Attorney, Agent, or Firm* — Lee Hong Degerman Kang Waimey

(57) ABSTRACT

The present invention provides a method and a device for transmitting/receiving an uplink signal on one cell (hereinafter, referred to as a specific cell) among a plurality of cells under a carrier aggregation situation in which the plurality of cells are aggregated. In one embodiment of the present invention, when the specific cell is a cell set in an unlicensed band, the specific cell is included in uplink grant downlink control information including a hybrid automatic repeat request (HARQ) process number field. Therefore, an asynchronous UL HARQ can be performed on the specific cell.

12 Claims, 14 Drawing Sheets

Related U.S. Application Data on Sep. 5, 2014, provisional application No. 62/075,266, filed on Nov. 5, 2014, provisional application No. 62/076,501, filed on Nov. 7, 2014, provisional application No. 62/082,054, filed on Nov. 19, 2014, provisional application No. 62/115,660, filed on Feb. 13, 2015, provisional application No. 62/132,523, filed on Mar. 13, 2015, provisional application No. 62/144,352, filed on Apr. 8, 2015, provisional application No. 62/173,923, filed on Jun. 10, 2015, provisional application No. 62/183,197, filed on Jun. 23, 2015.

(51) Int. Cl.

| | | |
|---|---|---|
| H04B 7/26 | (2006.01) | |
| H04L 1/18 | (2006.01) | |
| H04B 7/06 | (2006.01) | |
| H04L 5/14 | (2006.01) | |
| H04W 72/04 | (2009.01) | |
| H04L 5/00 | (2006.01) | |
| H04L 27/26 | (2006.01) | |
| H04W 16/14 | (2009.01) | |
| H04W 52/14 | (2009.01) | |
| H04W 52/28 | (2009.01) | |
| H04W 52/34 | (2009.01) | |
| H04W 52/38 | (2009.01) | |

(52) U.S. Cl.
CPC .............. *H04L 1/18* (2013.01); *H04L 1/1864* (2013.01); *H04L 5/001* (2013.01); *H04L 5/0048* (2013.01); *H04L 5/14* (2013.01); *H04L 27/2601* (2013.01); *H04W 16/14* (2013.01); *H04W 52/146* (2013.01); *H04W 52/281* (2013.01); *H04W 52/34* (2013.01); *H04W 52/38* (2013.01); *H04W 72/042* (2013.01); *H04W 72/0413* (2013.01); *H04W 72/0446* (2013.01); *H04W 72/0473* (2013.01); *H04W 52/365* (2013.01)

(56) References Cited

U.S. PATENT DOCUMENTS

| | | | |
|---|---|---|---|
| 9,717,084 | B2 | 7/2017 | Nishikawa et al. |
| 9,769,771 | B2 | 9/2017 | Nogami et al. |
| 2009/0268693 | A1* | 10/2009 | Lindh ................ H04W 72/042 370/336 |
| 2010/0131813 | A1* | 5/2010 | Kim ..................... H04L 1/0618 714/748 |
| 2011/0269490 | A1 | 11/2011 | Earnshaw et al. |
| 2012/0250631 | A1 | 10/2012 | Hakola et al. |
| 2012/0307775 | A1* | 12/2012 | Chung ................ H04L 1/1671 370/329 |
| 2013/0114505 | A1 | 5/2013 | Haim et al. |
| 2013/0163543 | A1 | 6/2013 | Freda et al. |
| 2013/0165134 | A1* | 6/2013 | Touag ............... H04W 72/0486 455/452.1 |
| 2013/0272231 | A1 | 10/2013 | Dinan |
| 2014/0036818 | A1 | 2/2014 | Koskela et al. |
| 2014/0056271 | A1 | 2/2014 | Ahn et al. |
| 2014/0112289 | A1 | 4/2014 | Kim et al. |
| 2014/0204854 | A1 | 7/2014 | Freda et al. |
| 2015/0055454 | A1 | 2/2015 | Yang et al. |
| 2015/0063245 | A1 | 3/2015 | Gao et al. |
| 2015/0085797 | A1* | 3/2015 | Ji .............................. H04J 3/16 370/329 |
| 2015/0264699 | A1* | 9/2015 | Fwu ..................... H04L 5/0001 370/329 |
| 2015/0327243 | A1 | 11/2015 | Yin et al. |
| 2017/0265172 | A1 | 9/2017 | Futaki |

FOREIGN PATENT DOCUMENTS

| | | |
|---|---|---|
| WO | 2013006988 | 1/2013 |
| WO | 2014088295 | 6/2014 |

OTHER PUBLICATIONS

ZTE, "Discussion on LTE in Unlicensed Spectrum", 3GPP Draft workshop on LTE in unlicensed spectrum, RWS-140021, Jun. 2014, 24 pages.

NTT Docomo, "Summary of email discussion [76b-08]", 3GPP TSG RAN WG1 Meeting #77, R1-142263, May 2014, 30 pages.

Samsung, "Multiple TA for TDD-FDD CA", 3GPP TSG RAN WG1 Meeting #76, R1-140365, Feb. 2014, 2 pages.

PCT International Application No. PCT/KR2015/008243, Written Opinion of the International Searching Authority dated Nov. 24, 2015, 19 pages.

PCT International Application No. PCT/KR2015/008249, Written Opinion of the International Searching Authority dated Dec. 15, 2015, 19 pages.

Alcatel Lucent, "UL Power Control and Power Scaling for Dual Connectivity", R1-140165, 3GPP TSG RAN WG1 Meeting #76, Feb. 2014, 5 pages.

U.S. Appl. No. 15/326,010, Office Action dated Apr. 12, 2018, 23 pages.

ZTE, "Physical layer aspects for Dual Connectivity", 3GPP TSG RAN WG1 Meeting #77, R1-142216, May 2014, 5 pages.

LG Electronics, "Power control for dual connectivity", 3GPP TSG RAN WG1 Meeting #76bis, R1-141344, Apr. 2014, 7 pages.

U.S. Appl. No. 15/326,010, Final Office Action dated Sep. 21, 2018, 23 pages.

U.S. Appl. No. 15/326,010, Office Action dated Mar. 7, 2019, 10 pages.

* cited by examiner

FIG. 13
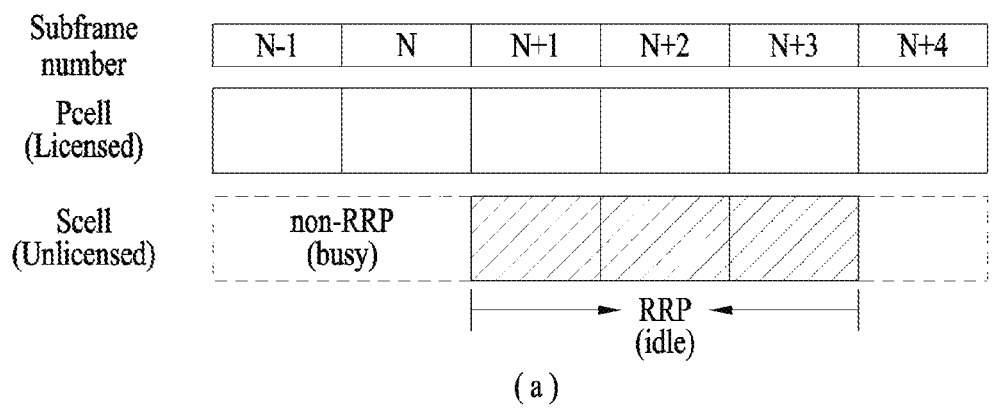
(a)
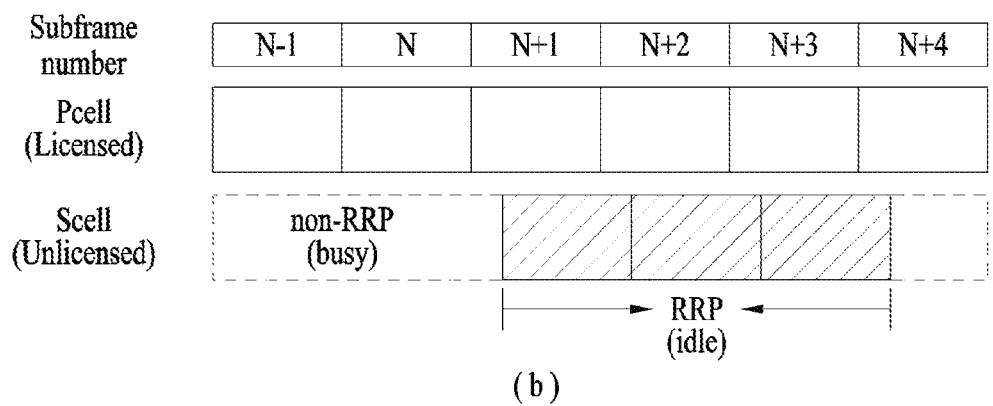
(b)

METHOD FOR TRANSMITTING UPLINK SIGNAL AND USER EQUIPMENT, AND METHOD FOR RECEIVING UPLINK SIGNAL AND BASE STATION

CROSS-REFERENCE TO RELATED APPLICATIONS

This application is the National Stage filing under 35 U.S.C. 371 of International Application No. PCT/KR2015/008243, filed on Aug. 6, 2015, which claims the benefit of U.S. Provisional Application Nos. 62/033,663, filed on Aug. 6, 2014, 62/046,186, filed on Sep. 5, 2014, 62/075,266, filed on Nov. 5, 2014, 62/076,501, filed on Nov. 7, 2014, 62/082,054, filed on Nov. 19, 2014, 62/115,660, filed on Feb. 13, 2015, 62/132,523, filed on Mar. 13, 2015, 62/144,352, filed on Apr. 8, 2015, 62/173,923, filed on Jun. 10, 2015 and 62/183,197, filed on Jun. 23, 2015, the contents of which are all hereby incorporated by reference herein in their entirety.

TECHNICAL FIELD

The present invention relates to a wireless communication system and, more particularly, to a method for receiving or transmitting uplink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, a method capable of simultaneously transmitting more signals by aggregating carriers used by different systems is needed.

The technical objects that can be achieved through the present invention are not limited to what has been particularly described hereinabove and other technical objects not described herein will be more clearly understood by persons skilled in the art from the following detailed description.

Technical Solutions

An embodiment of the present invention provides a method and apparatus for performing asynchronous UL HARQ on a specific cell.

In an aspect of the present invention, provided herein is a method of transmitting an uplink signal by a user equipment (UE), comprising: receiving uplink (UL) grant downlink control information (DCI) for a specific cell; and transmitting UL data on the specific cell based on the UL grant DCI.

In another aspect of the present invention, provided herein is a user equipment (UE) for transmitting an uplink signal, comprising: a radio frequency (RF) unit configured to transmit or receive a signal and a processor configured to control the RF unit. The processor may be configured to control the RF unit to receive uplink (UL) grant downlink control information (DCI) for a specific cell and control the RF unit to transmit UL data on the specific cell based on the UL grant DCI.

In another aspect of the present invention, provided herein is a method of receiving an uplink signal by a base station (BS), comprising: transmitting uplink (UL) grant downlink control information (DCI) for a specific cell to a user equipment (UE); and receiving UL data on the specific cell based on the UL grant DCI from the UE.

In another aspect of the present invention, provided herein is a base station (BS) for receiving an uplink signal, comprising: a radio frequency (RF) unit configured to transmit or receive a signal and a processor configured to control the RF unit. The processor may be configured to control the RF unit to transmit uplink (UL) grant downlink control information (DCI) for a specific cell to a user equipment and control the RF unit to receive UL data on the specific cell based on the UL grant DCI from the UE.

In each aspect of the present invention, if the specific cell is a cell configured in an unlicensed band, the UL grant DCI may include a hybrid automatic repeat request (HARQ) process number field.

In each aspect of the present invention, if the specific cell is a cell configured in a licensed band, the UL grant DCI may not include the HARQ process number field.

In each aspect of the present invention, if the specific cell is the cell configured in the unlicensed band, the UL grant DCI may further include a redundancy version (RV) field in addition to a 5-bit modulation and coding scheme field.

In each aspect of the present invention, the UL grant DCI may be transmitted and received in a subframe n. Transmission and reception of the UL data may be performed in a subframe n+k (where k is a positive integer).

In each aspect of the present invention, retransmission UL grant DCI for the specific cell may be transmitted/received in a subframe n' (where n' is an integer greater than n+k). Retransmission/rereception for the UL data may be performed according to the retransmission UL grant DCI in a subframe n'+k, In each aspect of the present invention, if the specific cell is the cell configured in the unlicensed band, the retransmission UL grant DCI may include, in a HARQ process number field of the retransmission UL grant DCI, the same HARQ process number as a HARQ process number included in the UL grant DCI.

In each aspect of the present invention, if the specific cell is the cell configured in the unlicensed band, the specific cell may correspond to a first type cell among the first type cell on which a reference signal used for channel measurement is aperiodically received and a second type cell on which the reference signal used for channel measurement is periodically received.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a new carrier which is not dedicated to a legacy system while maintaining compatibility with the legacy system can be aggregated with a carrier of the legacy system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 13 illustrates a subframe configuration of a reserved resource period (RRP).

MODE FOR CARRYING OUT THE INVENTION

Figure 1:
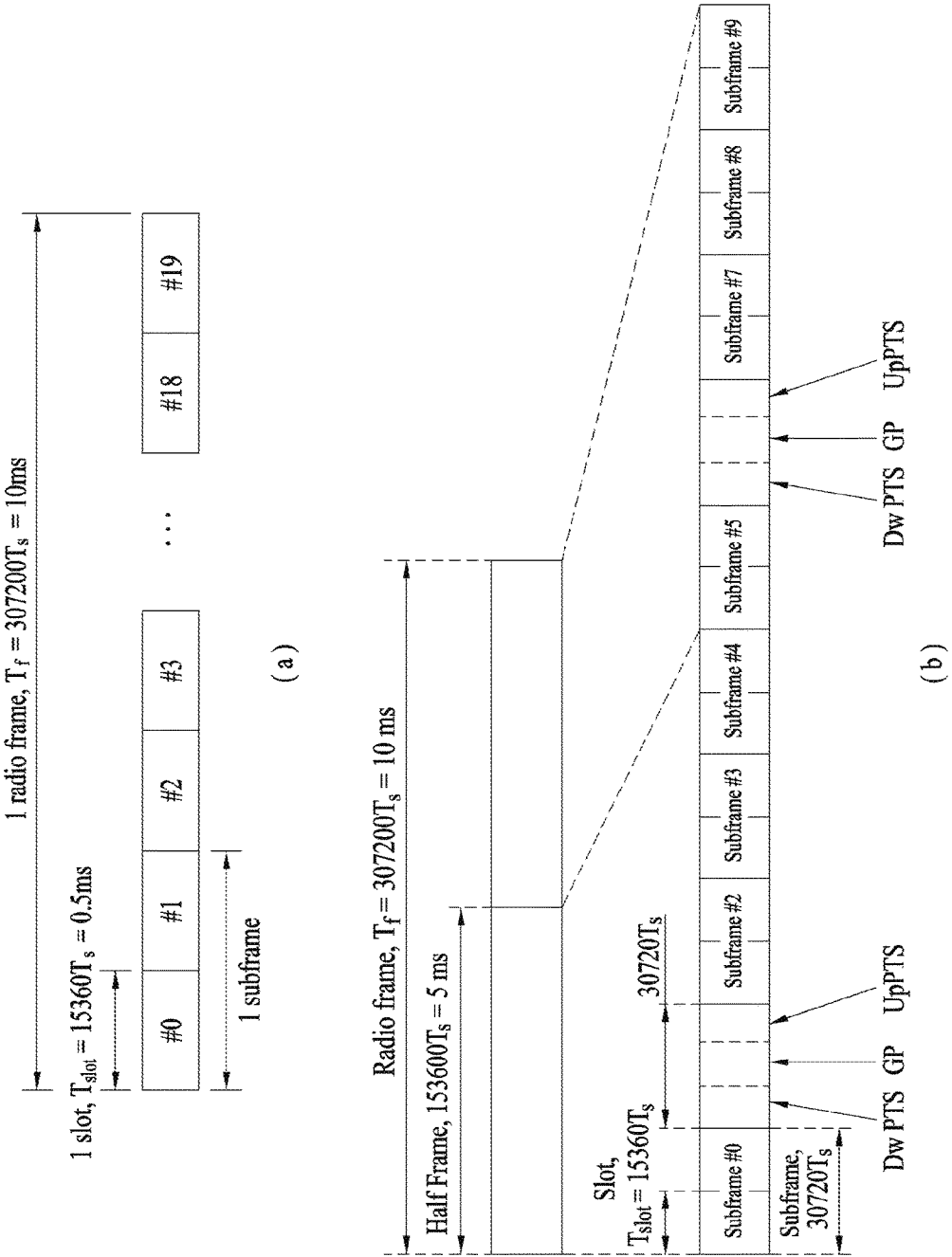
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, the UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signa.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
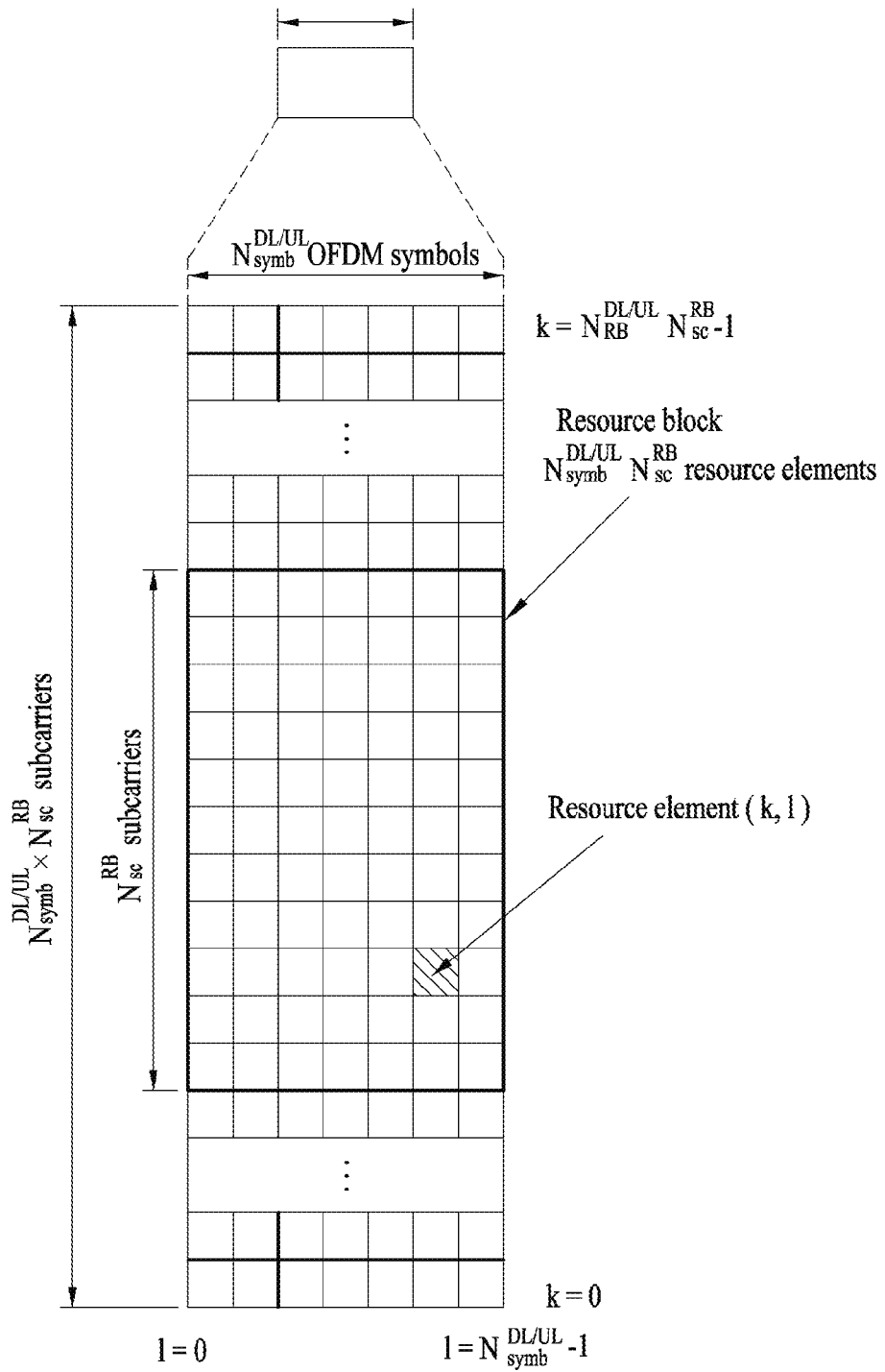
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb1} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
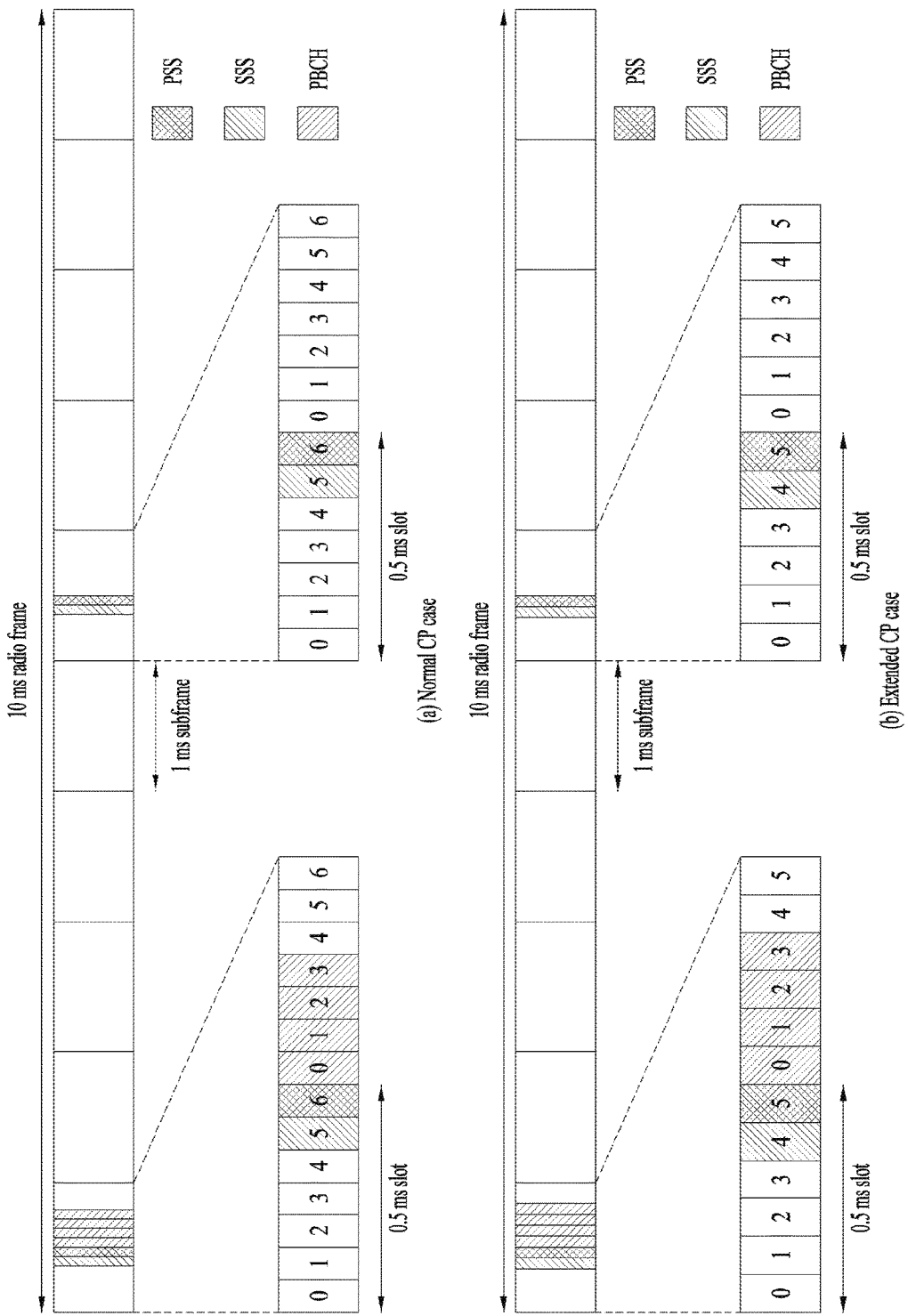
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. After performing the aforementioned procedure, the UE may perform PDDCH/PDSCH reception and PUSCH/PUCCH transmission as general uplink/downlink transmission procedures.

Figure 4:
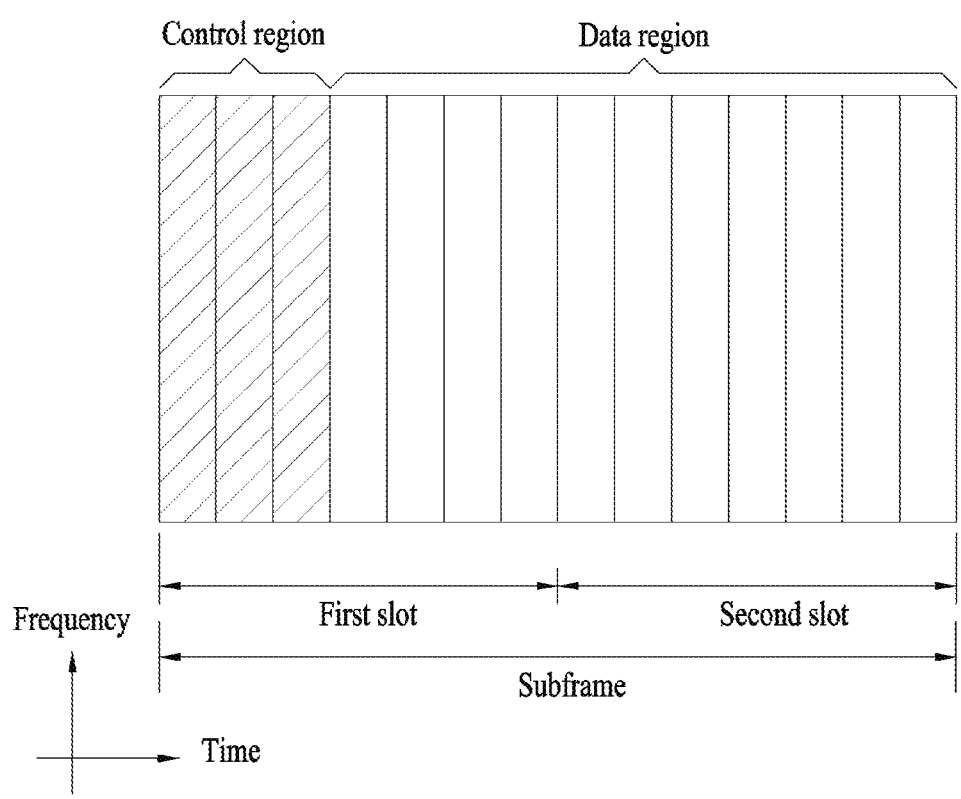
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The following table shows examples of DCI formats.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH. Hereinafter, a PDCCH and an EPDCCH are simply referred to as PDCCHs except in cases specific to the EPDCCH. The present invention may be applied to an EPDCCH, a PUSCH, and a PDSCH and/or a PUSCH scheduled by the EPDCCH as well as to a PDCCH, a PUCCH, and a PDSCH and/or a PUSCH scheduled by the PDCCH.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (UE SS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE.

Figure 5:
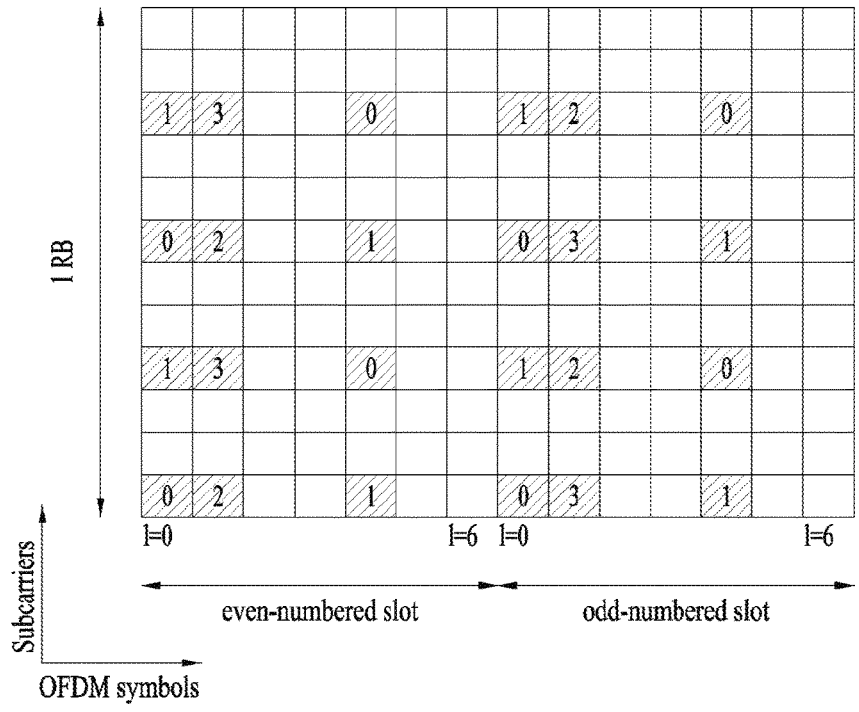
FIG. 5 illustrates configuration of cell specific reference signals (CRSs).

FIG. 5 illustrates configuration of cell specific reference signals (CRSs). Especially, FIG. 5 illustrates configuration of CRSs for a 3GPP LTE system supporting a maximum of four antennas.

In a legacy 3GPP system, since a CRS is used for both demodulation and measurement, the CRS is transmitted over an entire DL bandwidth in all DL subframes in a cell supporting PDSCH transmission and is transmitted over all antenna ports configured at an eNB.

The UE may measure CSI using a CRS and demodulate a signal received on a PDSCH in a subframe including the CRS by using the CRS. That is, the eNB transmits the CRS at a predetermined location in each of all RBs and the UE performs channel estimation based on the CRS and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRS, since the eNB should transmit the CRS in all RBs, unnecessary RS overhead occurs. To solve such a problem, in a 3GPP LTE-A system, a UE-specific RS (hereinafter, UE-RS) and a CSI-RS are further defined in addition to the CRS. The UE-RS is used to perform demodulation and the CSI-RS is used to derive CSI. The UE-RS is a kind of a DRS. The UE-RS and the CRS may be demodulation RSs in terms of usage because both signals are used for demodulation. The CSI-RS and the CRS may be measurement RSs in terms of usage because both signals are used for channel measurement or channel estimation.

Figure 6:
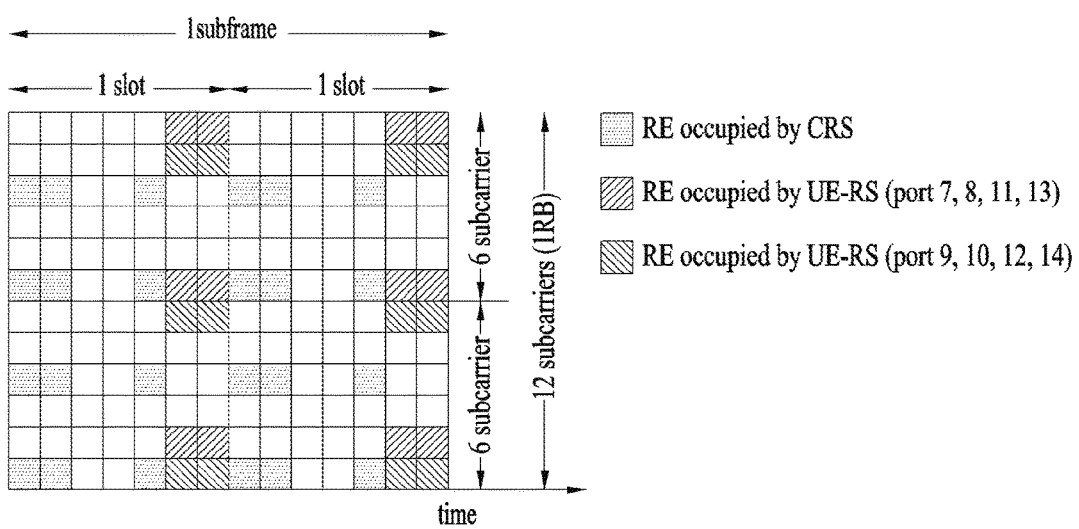
FIG. 6 illustrates UE-specific reference signals (UE-RSs).

FIG. 6 illustrates UE-specific reference signals (UE-RSs). In more detail, FIG. 6 illustrates REs occupied by UE-RSs among REs in one RB of a normal DL subframe with a normal CP.

UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. In addition, the UE-RS is transmitted only on antenna port(s) corresponding respectively to layer(s) of the PDSCH, unlike the CRS transmitted on all antenna port(s) regardless of the number of layers of the PDSCH. Accordingly, the UE-RS can reduce RS overhead relative to the CRS.

Figure 7:
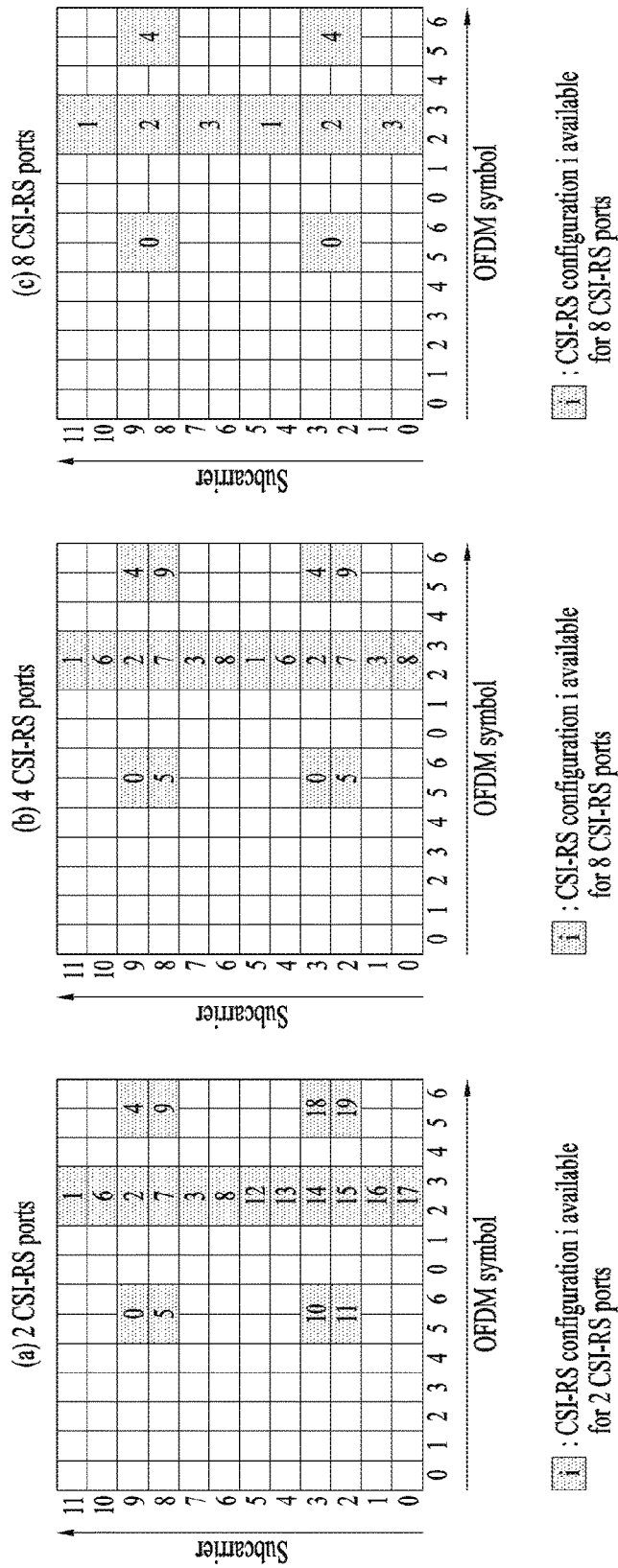
FIG. 7 illustrates channel state information reference signal (CSI-RS) configurations.

FIG. 7 illustrates channel state information reference signal (CSI-RS) configurations.

The CSI-RS is a DL RS introduced in the 3GPP LTE-A system, not for demodulation but for channel measurement. In the 3GPP LTE-A system, a plurality of CSI-RS configurations is defined for CSI-RS transmission.

FIG. 7(*a*) illustrates 20 CSI-RS configurations 0 to 19 available for CSI-RS transmission through two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, referring to Equation 25, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair but also with subframes in which CSI-RSs are configured. That is, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number is assigned and a CSI-RS configuration varying according to a CSI-RS configuration number, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs.

Subframes satisfying "$(10n_f+\text{floor}(n_s/2)-\Delta_{CSI-RS})\text{mod} T_{CSI-RS}=0$" are subframes including a CSI-RS. Here, $n_f$ denotes a radio frame number in a radio frame and $n_s$ denotes a slot number in a radio frame.

A UE configured as transmission mode defined after the 3GPP LTE-A system (e.g. transmission mode 9 or other newly defined transmission mode) may perform channel measurement using a CSI-RS and demodulate or decode a PDSCH using the UE-RS.

Figure 8:
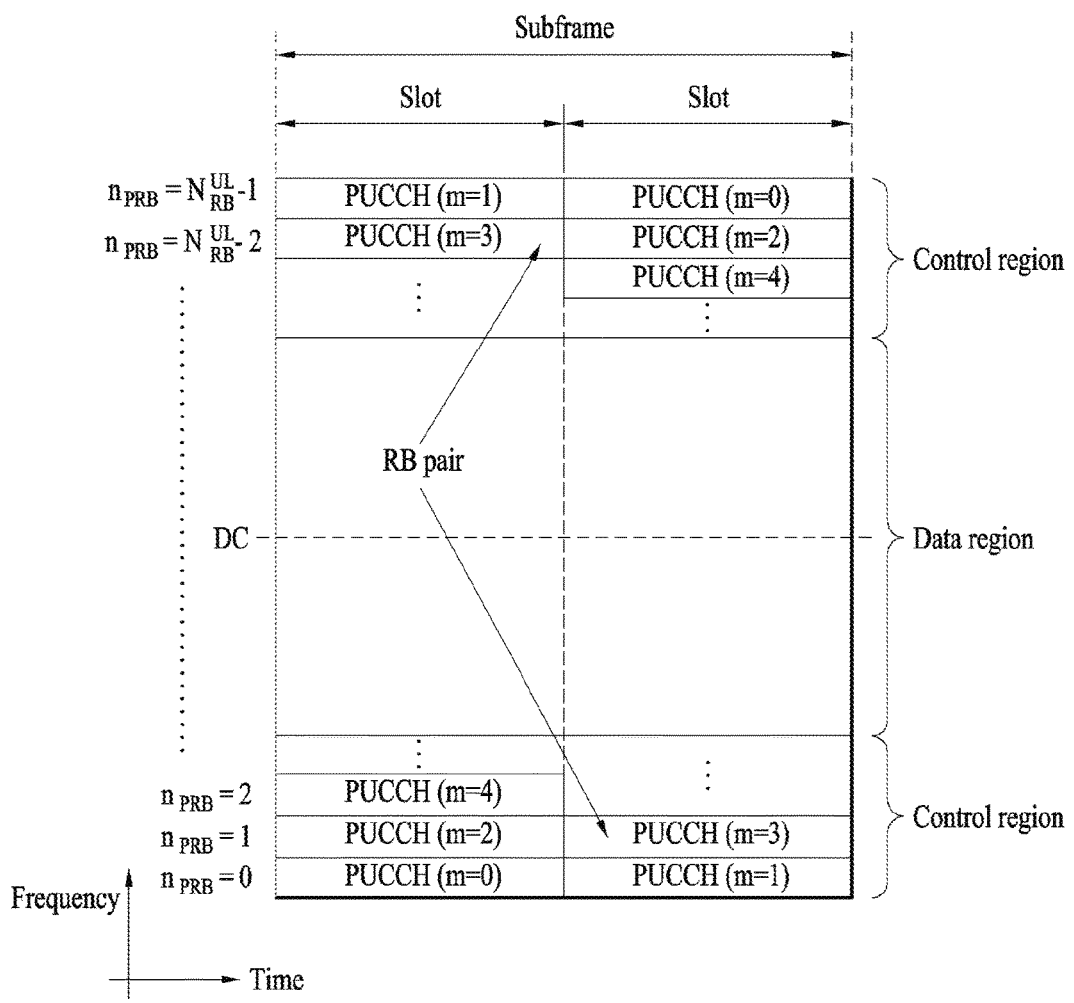
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Figure 9:
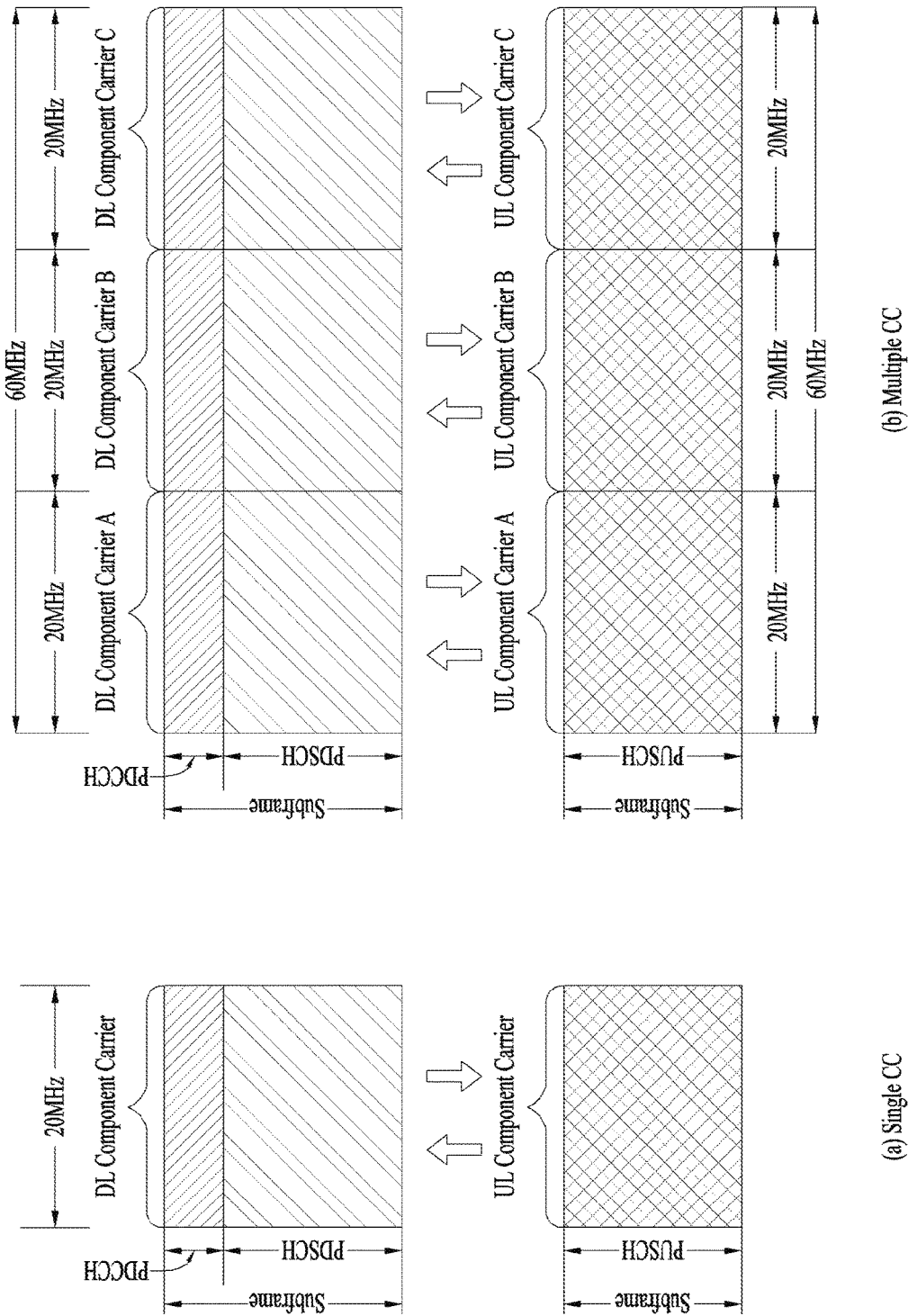
FIG. 9 is a diagram for explaining single-carrier communication and multi-carrier communication.

FIG. 9 is a diagram for explaining single-carrier communication and multi-carrier communication. Specially, FIG. 9(a) illustrates a subframe structure of a single carrier and FIG. 9(b) illustrates a subframe structure of multiple carriers.

Referring to FIG. 9(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 9(b), three 20 MHz CCs in each of UL and DL are aggregated to support a BW of 60 MHz. The CCs may be contiguous or non-contiguous in the frequency domain. Although FIG. 9(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the S cell on the downlink will be referred to as downlink secondary CC (DL SCC), and the carrier corresponding to the S cell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 10:
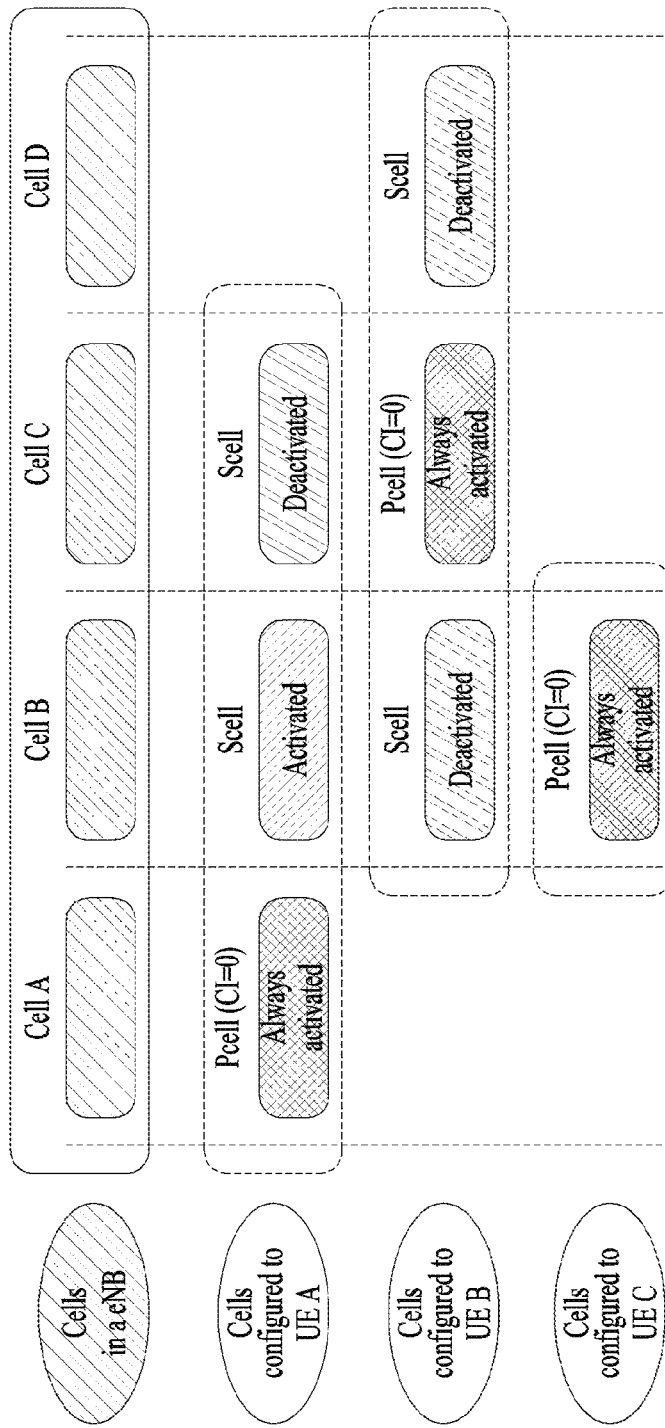
FIG. 10 illustrates the state of cells in a system supporting CA.

FIG. 10 illustrates the state of cells in a system supporting CA.

In FIG. 10, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 10, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized as below.

CIF disabled: A PDCCH on a DL CC assigns PDSCH resources on the same DL CC or PUSCH resources on a single linked UL CC
No CIF
Same as an LTE PDCCH structure (same coding and same CCE-based resource mapping) and as a DCI format
CIF enabled: a PDCCH on a DL CC can assign PDSCH/PUSCH resources on a specific DL/UL CC among a plurality of aggregated DL/UL CCs using a CIF.
  Extended LTE DCI format with CIF
    CIF (if configured) is a fixed x-bit field (e.g. x=3).
    CIF (if configured) location is fixed regardless of DCI format size.
  Reuse of the LTE PDCCH structure (same coding and same CCE-based resource mapping)

One or more scheduling cells may be configured for one UE and one of the scheduling cells may be a PCC which is in charge of specific DL control signaling and UL PUCCH transmission. A scheduling cell set may be configured UE-specifically, UE-group-specifically, or cell-specifically. The scheduling cell may be configured so as to directly schedule at least itself. That is, the scheduling cell may become a scheduled cell thereof. In the present invention, a cell carrying a PDCCH is referred to as a scheduling cell, a monitoring cell, or an MCC and a cell carrying a PDSCH/PUSCH scheduled by the PDCCH is referred to as a scheduled cell.

The scheduling cell includes a DL CC as a part of all carrier aggregated cells. The UE detects/decodes the PDCCH only on a corresponding DL CC. In this case, a PDSCH/PUSCH of the scheduling cell or a scheduled cell refers to a PDSCH/PUSCH configured to be transmitted on the corresponding cell. A PHICH of the scheduling cell or the scheduled cell refers to a PHICH carrying ACK/NACK for a PUSCH transmitted on the corresponding cell.

With introduction of M2M technology, multi-node systems, carrier aggregation, TDD, etc., a method for effectively transmitting a large amount of ACK/NACK information at one time has been demanded. The present invention proposes a method for effectively transmitting UL ACK/NACK information. First, the terms used in association with UL ACK/NACK information transmission of the present invention are summarized below.

HARQ-ACK (Hybrid Automatic Repeat reQuest Acknowledgement): This represents a reception response result to DL transmission (e.g. PDSCH or SPS release PDCCH), i.e. an ACK/NACK/DTX response (simply, ACK/NACK response, ACK/NACK, A/N response, or A/N). The ACK/NACK response refers to ACK, NACK, DTX, or NACK/DTX. HARQ-ACK for a CC or HARQ-ACK of a CC refers to an ACK/NACK response to DL transmission related to the CC (e.g. scheduled for the CC). A PDSCH may be replaced with a transport block or a codeword.

PDSCH: This corresponds to a DL grant PDCCH. The PDSCH is used interchangeably with a PDSCH with a PDCCH in this specification.

SPS release PDCCH: This refers to a PDCCH indicating SPS release. A UE feeds back ACK/NACK information about the SPS release PDCCH on UL.

SPS PDSCH: This refers to a PDSCH transmitted on DL using resources configured semi-statically by SPS. The SPS PDSCH has no DL grant PDCCH corresponding thereto. In this specification, the SPS PDSCH is used interchangeably with a PDSCH without a PDCCH.

PUCCH index: This corresponds to a PUCCH resource. A PUCCH index indicates, for example, a PUCCH resource index. The PUCCH resource index is mapped to at least one of an orthogonal cover (OC), a cyclic shift (CS), and a PRB.

ARI (ACK/NACK Resource Indicator): This is used to indicate a PUCCH resource. For example, the ARI may be used to indicate a resource change value (e.g. offset) for a specific PUCCH resource (group) (configured by a higher layer). As another example, the ARI may be used to indicate a specific PUCCH resource (group) index in a PUCCH resource (group) set (configured by a higher layer). The ARI may be included in a TPC field of a PDCCH corresponding to a PDSCH on an SCC. PUCCH power control is performed through a TPC field in a PDCCH that schedules a PCC (i.e. PDCCH corresponding to a PDSCH on a PCC). The ARI may be included in a TPC field of a PDCCH other than a PDCCH that has a downlink assignment index (DAI) initial value and schedules a specific cell (e.g. PCell). The ARI is used interchangeably with a HARQ-ACK resource indication value.

DAI (Downlink Assignment Index): This is included in DCI transmitted over a PDCCH. The DAI may indicate an order value or a counter value of a PDCCH. For convenience, a value indicated by a DAI field of a DL grant PDCCH is referred to as a DL DAI and a value indicated by a DAI field of a UL grant PDCCH is referred to as a UL DAI.

Implicit PUCCH resource: This represents a PUCCH resource/index linked to the lowest CCE index of a PDCCH that schedules a PCC or is transmitted on the PCC.

Explicit PUCCH resource: This may be indicated using an ARI.

PDCCH that schedules a CC: This indicates a PDCCH that schedules a PDSCH or a PUSCH on the CC. That is, the PDCCH that schedules a CC refers to a PDCCH corresponding to a PDSCH or a PUSCH on the CC.

PCC (Primary Component Carrier) PDCCH: This represents a PDCCH that schedules a PCC. That is, the PCC PDCCH represents a PDCCH corresponding to a PDSCH or a PUSCH on the PCC. The PCC PDCCH is transmitted only on the PCC on the assumption that cross-CC scheduling is not performed for the PCC.

SCC (Secondary Component Carrier) PDCCH: This represents a PDCCH that schedules an SCC. That is, the SCC PDCCH represents a PDCCH corresponding to a PDSCH or a PUSCH on the SCC. When cross-CC scheduling is permitted for the SCC, the SCC PDCCH may be transmitted on a CC other than the SCC (e.g. on a PCC or another SCC). When cross-CC scheduling is not permitted for the SCC, the SCC PDCCH is transmitted only on the SCC.

Cross-CC scheduling: This refers to an operation of transmitting a PDCCH that schedules an SCC on a CC other than the SCC (e.g. on a PCC or another SCC). When only two CCs of a PCC and an SCC are present, cross-CC scheduling refers to an operation of scheduling/transmitting all PDCCHs only on one PCC.

Non-cross-CC scheduling: This represents an operation of scheduling/transmitting a PDCCH that schedules each CC on the CC.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4

GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

Prior to description of embodiments of the present invention, an IEEE 802.11 system will be described in detail as an example of a CSMA based system to which the embodiments of the present invention are applicable. Although the IEEE 802.11 system is described as an example of the CSMA based system for convenience, the embodiments of the present invention may be applied to other CSMA based systems.

Figure 11:
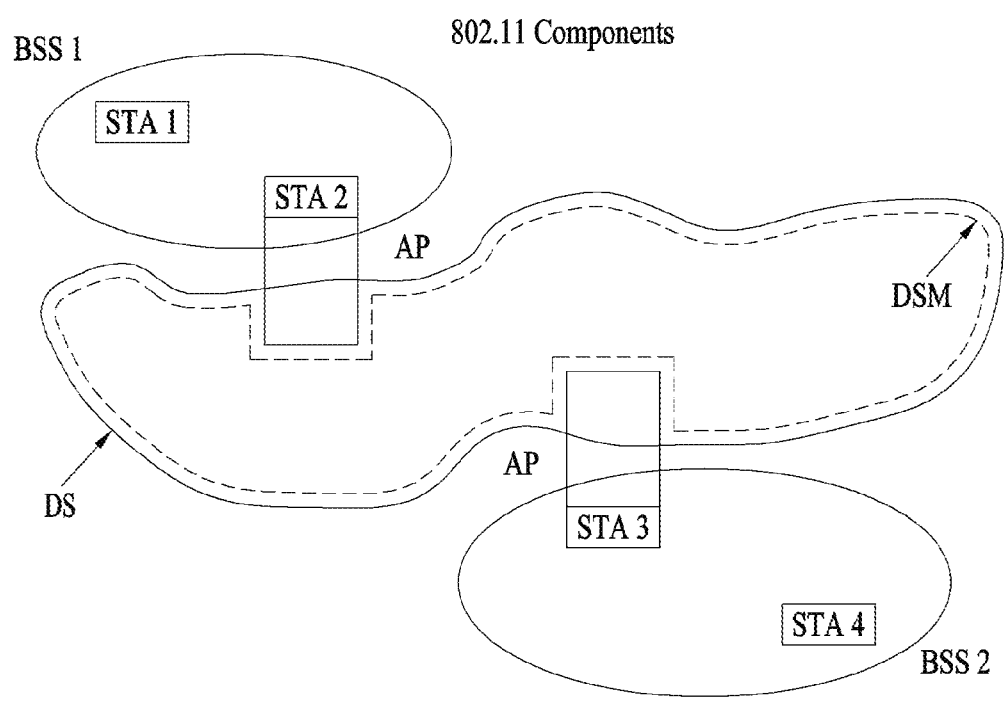
FIG. 11 is a diagram illustrating an IEEE 802.11 system to which the present invention is applicable.

FIG. 11 is a diagram illustrating an exemplary structure of an IEEE 802.11 system to which the present invention is applicable.

The structure of the IEEE 802.11 system may be configured by a plurality of components and may provide a WLAN that supports station (STA) mobility transparent for higher layers according to interaction of the components. In a WLAN system, an STA is a device operating according to MAC/PHY specifications of IEEE 802.11. The STA includes an AP STA and a non-AP STA. The non-AP STA corresponds to a device that a user generally handles in person, such as a laptop computer or a mobile phone.

The non-AP STA may be referred to as a terminal, a wireless transmit/receive unit (WTRU), a user equipment (UE), a mobile station (MS), a mobile terminal (MT), a mobile subscriber station (MSS), etc. The AP may correspond to a base station (BS), a Node-B, an evolved Node-B (eNB), a base transceiver system (BTS), a femto BS, a pico BS, etc. in other wireless communication fields.

Referring to FIG. 11, a basic service set (BSS) may correspond to a basic component block in an IEEE 802.11 LAN. An ellipse that defines a BSS in FIG. 9 may indicate a coverage area in which STAs belonging to the corresponding BSS maintain communication. This area may be referred to as a basic service area (BSA). If an STA moves out of the BSA, the STA cannot directly communicate with other STAs in the BSA.

The most basic type of BSS in the IEEE 802.11 LAN is an independent BSS (IBSS). For example, the IBSS may have a minimum configuration including only two STAs. This configuration is possible when STAs can directly communicate with each other. This type of LAN may be configured as necessary rather than being pre-designed and configured and may be called an ad-hoc network.

When an STA is turned on or off, or enters or leaves the coverage of a BSS, membership of STAs in the BSS may be dynamically changed. To become a member of the BSS, an STA may join the BSS using a synchronization procedure. To access all services based on the BSS, an STA needs to be associated with the BSS. Such association may be dynamically configured and may use a distribution system service (DSS).

In a LAN, a direct STA-to-STA distance may be limited by physical (hereinafter, PHY) layer performance. While this distance limit may be sufficient in some cases, communication between STAs having a longer distance therebetween may be needed in other cases. To support an extended coverage, a distribution system (DS) may be configured.

The DS refers to a structure in which BSSs are connected to each other. Specifically, BSSs may be present as components of an extended form of a network composed of a plurality of BSSs rather than being independently present.

The DS is a logical concept and may be specified by characteristics of a distribution system medium (DSM). In IEEE 802.11 standards, a wireless medium (WM) and the DSM are logically discriminated. These logical media are used by different components for different purposes. In definition of IEEE 802.11 standards, the media are not limited as the same medium or different media. The fact that plural media are logically different from each other may explain flexibility of an IEEE 802.11 LAN structure (a DS structure or other network structures). That is, the IEEE 802.11 LAN structure may be implemented in various manners and may be independently specified by physical characteristics of implementations thereof.

The DS may support mobile devices by providing seamless integration of a plurality of BSSs and providing logical services necessary to handle addresses to a destination.

The AP (i.e. an AP STA) refers to an entity that enables associated STAs to access the DS through the WM and has STA functionality. Data may be transmitted between a BSS and the DS through the AP. For example, STA2 and STA3 shown in FIG. 9 have STA functionality and provide a function of enabling associated STAs (STA1 and STA4) to access the DS. In addition, all APs are addressable entities because they basically correspond to STAs. An address used by an AP for communication on the WM does not necessarily need to be equal to an address used by the AP for communication on the DSM.

Data transmitted from one of STAs associated with an AP to an STA address of the AP may be received at an uncontrolled port at all times and processed by an IEEE 802.1X port access entity. In addition, the transmitted data (or frame) may be delivered to the DS when a controlled port is authenticated.

In a WLAN system based on IEEE 802.11, a basic access mechanism of MAC is a CSMA/CA mechanism. The CSMA/CA mechanism is also called a distributed coordination function (DCF) of IEEE 802.11 MAC and basically adopts an access mechanism of "listen before talk". According to this type of access mechanism, an AP and/or an STA may perform CCA for sensing a radio channel or a medium for a predetermined time duration (e.g. DCF inter-frame space (DIFS) prior to starting transmission. If it is determined that the medium is in an idle state as a sensing result, the AP and/or the STA starts to transmit a frame through the medium. Meanwhile, if it is sensed that the medium is in an occupied state, the AP and/or the STA may attempt to transmit the frame after waiting a delay duration for medium access (e.g. a random backoff period) without starting transmission thereof. Since it is expected that multiple STAs attempt to perform frame transmission after waiting different times by applying the random backoff period, collision can be minimized.

Hereinafter, there are provided embodiments of a HARQ operation for a carrier aggregation situation including a cell/carrier on which an available resource duration is aperiodically and/or discontinuously secured/configured as in an LTE-U system that opportunistically operates based on carrier sensing in the aforementioned unlicensed band.

Figure 12:
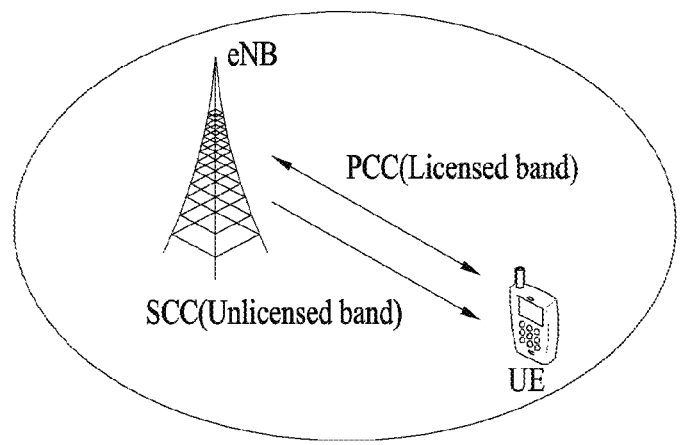
FIG. 12 illustrates a carrier aggregation situation of a 3GPP LTE-A band, which is a licensed band, and an unlicensed band (hereinafter, LTE-U band).

FIG. 12 illustrates a carrier aggregation situation of a 3GPP LTE-A band, which is a licensed band, and an unlicensed band (hereinafter, an LTE-U band).

Referring to FIG. 12, an eNB may transmit a signal to a UE or the UE may transmit a signal to the eNB in the carrier aggregation situation of the LTE-A band and the LTE-U band. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a carrier aggregation scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell that is configured in a licensed band for 3GPP LTE/LTE-A and operates by a 3GPP LTE/LTE-A scheme will be referred to as an Lcell and a cell that is configured in an unlicensed band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy, or continuously transmitting an RS and a data signal so that a signal of a specific power level or more may be seamlessly transmitted during the RRP.

The RRP may be configured based on carrier sensing performed by the eNB. If the eNB has determined the RRP during which the eNB desires to occupy the LTE-U band in advance, the eNB may pre-inform the UE of the RRP so that the UE may maintain a communication transmission/reception link during the indicated RRP. As a scheme of informing the UE of information about the RRP, the eNB may transmit the information about the RRP through another CC (e.g. the LTE-A band) connected in the form of carrier aggregation.

An entity for determining the RRP may differ according to whether transmission is performed on DL or UL. For example, the RRP for DL transmission (hereinafter, a DL RRP) may be determined by the eNB based on carrier sensing performed by the eNB. The RRP for UL transmission (a UL RRP) may be determined by the eNB based on carrier sensing performed by the eNB and then indicated to the UE. Alternatively, the UE may confirm or determine the UL RRP in units of subframes by confirming a channel state, i.e. through carrier sensing performed by the UE, prior to signal transmission.

On a cell used for legacy carrier aggregation, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling (CCS)) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel. A start timing of the RRP may be periodically or semi-statically configured through higher layer signaling. If the start timing of the RRP should be set to SF #n, the start timing of the RRP may be designated through physical layer signaling in SF #n or SF #(n-k).

FIG. 13 illustrates a subframe configuration of an RRP.

The RRP may be configured such that boundaries of subframe(s) constituting the RRP are aligned with boundaries of subframe(s) configured on a Pcell, as illustrated in FIG. 13(a), or such that the boundaries of the subframe(s) constituting the RRP are misaligned with the boundaries of the subframe(s) configured on the Pcell, as illustrated in FIG. 13(b).

As illustrated in FIG. 13(a), the RRP configured such that subframe boundaries and subframe numbers/indexes on a Ucell are aligned with those on the Pcell is referred to as an aligned-RRP and, as illustrated in FIG. 13(b), the RRP configured such that subframe boundaries and subframe numbers/indexes on the Ucell are misaligned with those on the Pcell is referred to as a floating-RRP. In the embodiments of the present invention, the meaning of aligning subframe boundaries between cells with each other is that an interval between subframe boundaries of two different cells is less than a specific time (e.g. CP length or X µs where X≥0).

The present invention proposes a control and handling method for PUSCH transmission in a carrier aggregation situation including a cell/carrier on which an available resource duration is aperiodically or discontinuously secured/configured as in an LTE-U system that opportunistically operates based on carrier sensing in the aforementioned LTE-U band.

Prior to description of embodiments of the present invention, a HARQ operation used for error control of UL data, a UL grant DCI format used for PUSCH scheduling, and a UL HARQ timing will now be described.

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, an eNB and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current communication system, the asynchronous HARQ scheme is used in DL and the synchronous HARQ scheme is used in UL.

Multiple subpackets used for initial transmission and retransmission based on the HARQ scheme are generated from one codeword packet. The generated multiple subpackets may be distinguished from each other by the length of each subpacket and the start position of each subpacket. Such a distinguishable subpacket is referred to as a redundancy version (RV) and information about the RV represents a scheduled start position of each RV.

Whenever HARQ is transmitted, a transmitter transmits a subpacket to a data channel. In this case, a receiver generates an RV of the subpacket for every HARQ transmission in a predetermined order between the transmitter and the receiver, or randomly generates the RV and transmits RV information through a control channel. The receiver maps a subpacket received through the data channel to an accurate position of a codeword packet in a predetermined RV order or using the RV information received through the control channel.

Figure 14:
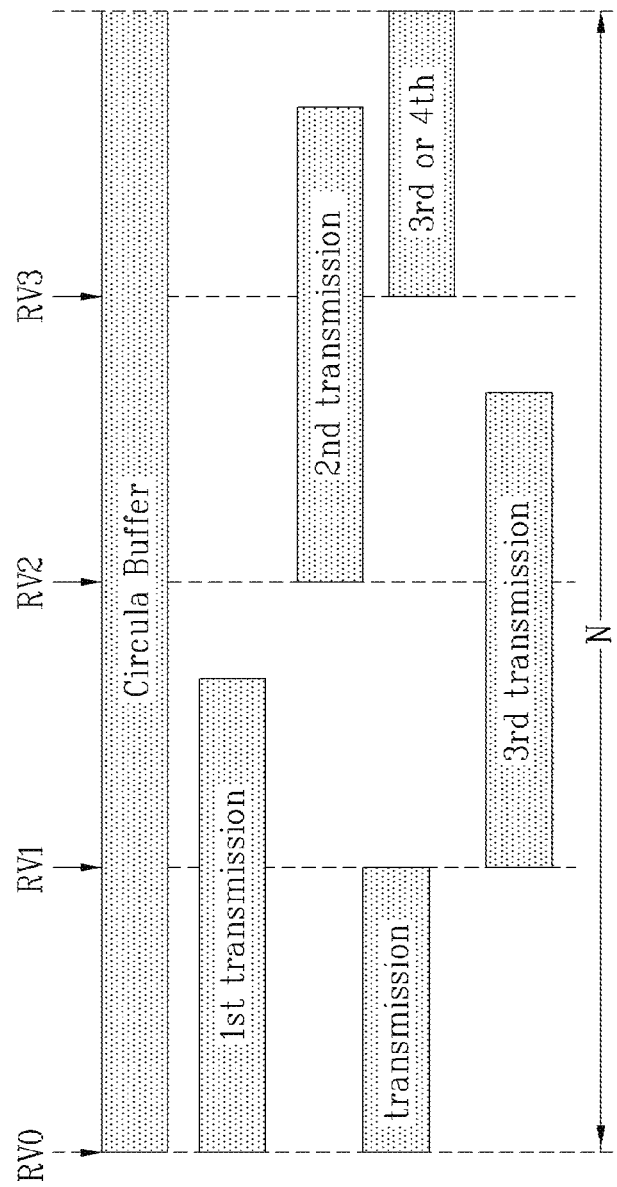
FIG. 14 illustrates hybrid automatic repeat request (HARQ) transmission when 4 fixed RV start positions are used.

FIG. 14 illustrates HARQ transmission when 4 fixed RV start positions are used. It is assumed in FIG. 14 that a static channel is used and the size of a subpacket used in every HARQ transmission is constant and is N/3. In FIG. 14, first transmission indicates a subpacket used for initial transmission based on the HARQ scheme and the other transmissions indicate three retransmitted subpackets based on the HARQ scheme. In FIG. 14, N denotes the size of a cyclic buffer.

A time delay occurs until an eNB receives ACK/NACK from a UE and transmits retransmission data after transmitting scheduling information and data according to the scheduling information. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

Among DCI formats, DCI format 0 and DCI format 4 are used as UL grant DCI. DCI format 0 includes fields:

Carrier indicator field: 0 or 3 bits;
Flag for format1/format1A differentiation: 1 bit;
Frequency hopping flag): 1 bit;
Resource block assignment and hopping resource allocation): ceil{$\log_2(N^{UL}_{RB}(N^{UL}_{RB}+1)/2)$} bits;
Modulation and coding scheme and redundancy version: 5 bits;
New data indicator (NDI): 1 bit;
TPC command for scheduled PUSCH: 2 bits;
Cyclic shift for DM RS and OCC index: 3 bits;
UL index;
Downlink assignment index (DAI): 2 bits;
CSI request: 1 or 2 bits;
SRS request: 2 bits;
Resource allocation type: 1 bit
as represented hereinabove.
DCI format 4 includes fields:
Carrier indicator field: 0 or 3 bits;
Resource block assignment and hopping resource allocation:

$$\max\left(\lceil\log_2(N^{UL}_{RB}(N^{UL}_{RB}+1)/2)\rceil, \left\lceil\log_2\left(\binom{\lceil N^{UL}_{RB}/P+1\rceil}{4}\right)\right\rceil\right)$$

bits, where P is UL resource block group (RBG) size;
TPC command for scheduled PUSCH: 2 bits;
Cyclic shift for DM RS and OCC index: 3 bits;
UL index;
Downlink assignment index (DAI): 2 bits;
CSI request: 1 or 2 bits;
SRS request: 2 bits;
Resource allocation type: 1 bit;
In addition, for transport block 1:
Modulation and coding scheme and redundancy version: 5 bits;
New data indicator (NDI): 1 bit
In addition, for transport block 2:
Modulation and coding scheme and redundancy version: 5 bits
New data indicator (NDI): 1 bit
as represented hereinabove.

Hereinafter, a UL HARQ timing will be described.

For FDD, there are 8 uplink HARQ processes for non-subframe bundling operation, i.e. normal HARQ operation, and 4 uplink HARQ processes for subframe bundling operation. The subframe bundling operation is configured by higher layers.

In a subframe bundling operation, a bundle of PUSCH transmissions consists of four consecutive UL subframes both in FDD and in TDD.

For FDD and normal HARQ operation, the UE shall upon detection of a PDCCH with DCI format 0 and/or a PHICH transmission in subframe n intended for the UE, adjust the corresponding PUSCH transmission in subframe n+4 according to the PDCCH and PHICH information.

For FDD and subframe bundling operation, the UE shall upon detection of a PDCCH with DCI format 0 in subframe n intended for the UE, and/or a PHICH transmission in subframe n−5 intended for the UE, adjust the corresponding first PUSCH transmission in the bundle in subframe n+4 according to the PDCCH and PHICH information.

For FDD and TDD, the NDI as signaled on PDCCH, the redundancy version (RV), and the transport block size (TBS) are delivered to higher layers. For TDD, the number of HARQ processes is determined by the DL/UL configuration as indicated in the following table.

TABLE 4

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

For TDD UL/DL configurations 1-6 and normal HARQ operation, the UE shall upon detection of a PDCCH with DCI format 0 and/or a PHICH transmission in subframe n intended for the UE, adjust the corresponding PUSCH transmission in subframe n+k according to the PDCCH and PHICH information, where k is given by the following table.

TABLE 5

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | | 4 | | | | | 4 |
| 3 | 4 | | | | | | | 4 | 4 | 4 |
| 4 | | | | | | | | | 4 | 4 |
| 5 | | | | | | | | | 4 | |
| 6 | 7 | 7 | | | | | 7 | 7 | | 5 |

For TDD UL/DL configuration 0 and normal HARQ operation the UE shall upon detection of a PDCCH with DCI format 0 and/or a PHICH transmission in subframe n intended for the UE, adjust the corresponding PUSCH transmission in subframe n+k if the most significant bit (MSB) of the UL index in the DCI format 0 is set to 1 or PHICH is received in subframe n=0 or 5 in the resource corresponding to $I_{PHICH}$=0, with k given in Table 5. If, for TDD UL/DL configuration 0 and normal HARQ operation, the least significant bit (LSB) of the UL index in the DCI format 0 is set to 1 in subframe n or a PHICH is received in subframe n=0 or 5 in the resource corresponding to $I_{PHICH}$=1, as defined in Section 9.1.2, or PHICH is received in subframe n=1 or 6, the UE shall adjust the corresponding PUSCH transmission in subframe n+7. If, for TDD UL/DL configuration 0, both the MSB and LSB of the UL index in the DCI format 0 are set in subframe n, the UE shall adjust the corresponding PUSCH transmission in both subframes n+k and n+7, with k given in Table 5.

For reference, $I_{PHICH}$ denotes a parameter associated with a PHICH resource. For TDD UL/DL configuration 0 with PUSCH transmission in subframe n=4 or 9, $I_{PHICH}$=1 and otherwise, $I_{PHICH}$0.

For TDD UL/DL configurations 1 and 6 and subframe bundling operation, the UE shall upon detection of a PDCCH with DCI format 0 in subframe n intended for the UE, and/or a PHICH transmission intended for the UE in subframe n−l with l given in Table 6, adjust the corresponding first PUSCH transmission in the bundle in subframe n+k, with k given in Table 5, according to the PDCCH and PHICH information.

TABLE 6

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | | 9 | 6 | | |
| 1 | | | 2 | | 3 | | | 2 | | 3 |
| 6 | 5 | 5 | | | | | 6 | 6 | | 8 |

For TDD UL/DL configuration 0 and subframe bundling operation, the UE shall upon detection of a PDCCH with DCI format 0 in subframe n intended for the UE, and/or a PHICH transmission intended for the UE in subframe n−1 with 1 given in Table 6, adjust the corresponding first PUSCH transmission in the bundle in subframe n+k, if the MSB of the UL index in the DCI format 0 is set to 1 or if $I_{PHICH}=0$, with k given in Table 5, according to the PDCCH and PHICH information. If, for TDD UL/DL configuration 0 and subframe bundling operation, the LSB of the UL index in the DCI format 0 is set to 1 in subframe n or if $I_{PHICH}=1$, the UE shall adjust the corresponding first PUSCH transmission in the bundle in subframe n+7, according to the PDCCH and PHICH information.

For FS1, an ACK/NACK received on the PHICH assigned to a UE in subframe i is associated with the PUSCH transmission in subframe i−4.

For FS2 UL/DL configuration 1-6, an ACK/NACK received on the PHICH assigned to a UE in subframe i is associated with the PUSCH transmission in the subframe i−k as indicated by the following table. For FS2 UL/DL configuration 0, an ACK/NACK received on the PHICH in the resource corresponding to $I_{PHICH}=0$, assigned to a UE in subframe i is associated with the PUSCH transmission in the subframe i−k as indicated by the following table. If, for FS2 UL/DL configuration 0, an ACK/NACK received on the PHICH in the resource corresponding to $I_{PHICH}=1$, assigned to a UE in subframe i is associated with the PUSCH transmission in the subframe i−6.

TABLE 7

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | | 7 | 4 | |
| 1 | | 4 | | | 6 | | | 4 | | 6 |
| 2 | | | | 6 | | | | | 6 | |
| 3 | 6 | | | | | | | 6 | 6 | 6 |
| 4 | | | | | | | | | 6 | 6 |
| 5 | | | | | | | | | 6 | |
| 6 | 6 | 4 | | | | | | 7 | 4 | 6 |

The physical layer in the UE, for downlink subframe i, if a transport block was transmitted in the associated PUSCH subframe then: ① if ACK is decoded on the PHICH in subframe i, delivers ACK to the higher layers (e.g. medium access control (MAC) layer), ② else delivers NACK to the higher layers.

For scheduled PUSCH transmissions in subframe n, a UE determines the corresponding PHICH resource of a serving cell c in subframe n+kPHICH, where kPHICH is always 4 for FDD and is given in the following table for TDD. For subframe bundling operation, the corresponding PHICH resource is associated with the last subframe in the bundle.

TABLE 8

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

As described above, since a legacy UL HARQ operation is synchronously performed, a UL grant timing, a PUSCH transmission timing corresponding to the UL grant timing, and a PHICH/UL grant timing for a PUSCH have been determined. Due to this, the UL grant timing, the PHICH timing, and a retransmission UL grant timing that are associated with PUSCH transmission may occur only in determined subframes. Thus, since subframes and UL HARQ timings are synchronized, UL grant DCI does not include a HARQ process number. This is because, even when the UL grant DCI does not include the HARQ process number, a UE can be aware of whether the UL grant DCI is for retransmission or for initial transmission based on a toggled state of an NDI and a subframe number. For example, if an NDI in currently received UL grant DCI is toggled relative to an NDI in DCI received at a previous UL grant timing, the UE may regard the currently received UL grant DCI as DCI for transmission of new data. Unlike this, if the NDI in the currently received UL grant DCI is not toggled relative to the NDI in the DCI received at a previous UL grant timing, the UE may regard the currently received UL grant DCI as DCI for retransmission of previously transmitted data.

Since HARQ timings of a predetermined HARQ process occur in determined subframes, even upon not receiving an RV, the UE may be aware of whether the UE has missed a PDCCH of a specific RV or not. Therefore, an MCS and RV field (hereinafter, an MCS field) in the UL grant DCI does not generally show variation of the RV. Except for a special case, the UE assumes that RVs of associated UL grant DCI are cyclically changed in order of 2->3->1->0, starting from RV=0 of UL grant DCI for initial transmission.

TABLE 9

| MCS Index $I_{MCS}$ | Modulation Order Qm | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |

TABLE 9-continued

| MCS Index $I_{MCS}$ | Modulation Order Qm | TBS Index $I_{TBS}$ | Redundancy Version $rv_{idx}$ |
|---|---|---|---|
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Referring to Table 9, although RVs are all 0 for $I_{MCS}$=to $I_{MCS}$=28, the UE assumes that RVs of UL grant DCI received in subframes associated with UL grant DCI are cyclically changed in order to 2->3->1->0, starting from RV=0 of the UL grant DCI for initial transmission. As an exception case, only for an MCS field value $I_{MCS}$=29, $I_{MCS}$=30, or $I_{MCS}$=31, data corresponding to an RV designated by an MCS field of the UL grant DCI, rather than data corresponding to an RV of a corresponding number, may be transmitted through a PUSCH.

For convenience of description, a CA situation is considered in which an Lcell operating by a legacy LTE scheme is configured as a Pcell and a Ucell operating by the above-described LTE-U scheme is aggregated with the Lcell as an Scell. Further, it is assumed for convenience of description that all SFs in an RRP are configured as UL SFs or include UL SFs. In the case of UL scheduling for the RRP, 1) a scheme in which one UL grant DCI schedules only one UL SF (which is present after a specific number of predefined SFs starting from a corresponding DCI detection timing) (hereinafter, single-SF scheduling) as in a legacy scheme or 2) a scheme in which one UL grant DCI simultaneously schedules a plurality of UL SFs (hereinafter, multi-SF scheduling) may be applied.

As opposed to in single-SF scheduling in which scheduling information for UL data transmission is valid only with respect to one SF, in multi-SF scheduling, scheduling information for UL data transmission is valid with respect to a plurality of SFs. For example, in single-SF scheduling, the UE performs UL transmission using an MCS and/or resource allocation information only in one UL SF according to corresponding scheduling. However, in multi-SF scheduling, the UE may perform UL transmission by applying the same MCS and/or resource allocation information to a plurality of UL SFs. In multi-SF scheduling, the same UL data only having different RVs may be transmitted in a plurality of UL SFs using the same MCS and/or resource allocation information or different UL data which is transmitted in the plural UL SFs but has the same MCS and/or resource allocation information may be applied to the plural UL SFs.

Based on the above-described conditions, embodiments of UL HARQ (e.g. UL grant/PUSCH/PHICH) timing configuration for CA including an RRP based Ucell and a PUSCH scheduling/transmission operation based on the UL HARQ timing configuration are proposed.

<UL HARQ Timing Configuration for PUSCH Transmission in Ucell>

For PUSCH transmission and scheduling through an RRP on a Ucell, UL HARQ timing (e.g. an SF interval between UL grant transmission and PUSCH transmission scheduled from UL grant transmission or an SF interval between PUSCH transmission and PHICH transmission corresponding to PUSCH transmission) configuration may be considered based on the following schemes. SFs described in the following schemes may be limited only to UL SFs.

In embodiments described below, a transmission entity of a PHICH and a (retransmission) UL grant is an eNB and a reception entity thereof is a UE. A transmission entity of a PUSCH is the UE and a reception entity thereof is the eNB.

(a) Embodiment 1 A UL HARQ timing applied to an FDD Scell is applied.

Figure 15:
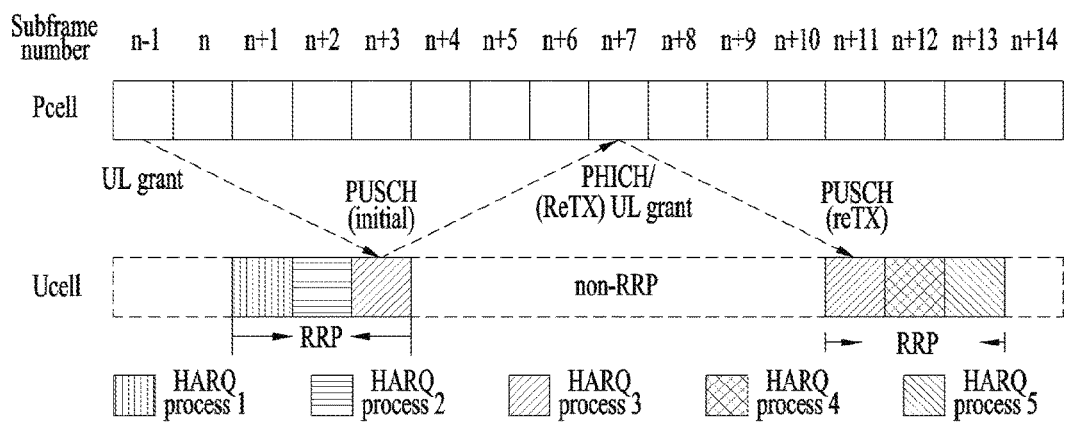
FIG. 15 illustrates a UL HARQ timing according to an embodiment of the present invention.

FIG. 15 illustrates a UL HARQ timing according to an embodiment of the present invention.

In Embodiment 1, a Ucell is regarded as being the same as a UL carrier of the FDD Scell and the following UL HARQ timing configured in the FDD Scell (according to whether a Pcell is FDD or TDD) in a legacy CA situation is applied. Hereinbelow, the Pcell may refer to a cell configured to (cross-CC) schedule the Ucell.

In the case of an FDD Pcell: A UL grant for scheduling PUSCH transmission in SF #n is transmitted/received through SF #(n−4). A PHICH and a retransmission UL grant, corresponding to a PUSCH, are transmitted/received through SF #(n+4). A PUSCH scheduled by the PHICH or the retransmission UL grant is transmitted/received through SF #(n+8). Herein, "8" indicates a round trip time (RTT) which is an SF interval between PUSCH transmission and retransmission for PUSCH transmission.

In the case of a TDD Pcell: A UL grant for scheduling PUSCH transmission in SF #n is transmitted/received through SF #(n−4). A PHICH and a retransmission UL grant, corresponding to a PUSCH, are transmitted/received through SF #(n+6) or SF #(n+4). Alternatively, the PHICH corresponding to the PUSCH is transmitted/received through SF #(n+4) and the retransmission UL grant is transmitted/received through SF #(n+6). A PUSCH scheduled from the PHICH or the retransmission UL grant is transmitted/received through SF #(n+10). Herein, "10" indicates an RTT which is an SF interval between PUSCH transmission and retransmission for PUSCH transmission.

In Embodiment 1, if an RRP is not configured in SF #(n+N) (where N=RTT) which is an adjacent retransmission timing for PUSCH transmission in SF #n, a UE may:

Alt 1-1) stop PHICH (NACK) based non-adaptive automatic retransmission (e.g. the UE transmits ACK to a higher layer thereof) or Alt 1-2) perform retransmission at the earliest retransmission timing, i.e. in SF #(n+k×N) (where k=1, 2, . . . , K), (present in the RRP) in a predetermined time duration after SF #n. If the RRP is not configured/set at the retransmission timing during the predetermined time duration, Alt 1-1 may be applied.

(b) Embodiment 2: The same HARQ process in SFs having the same order in an RRP is configured.

Figure 16:
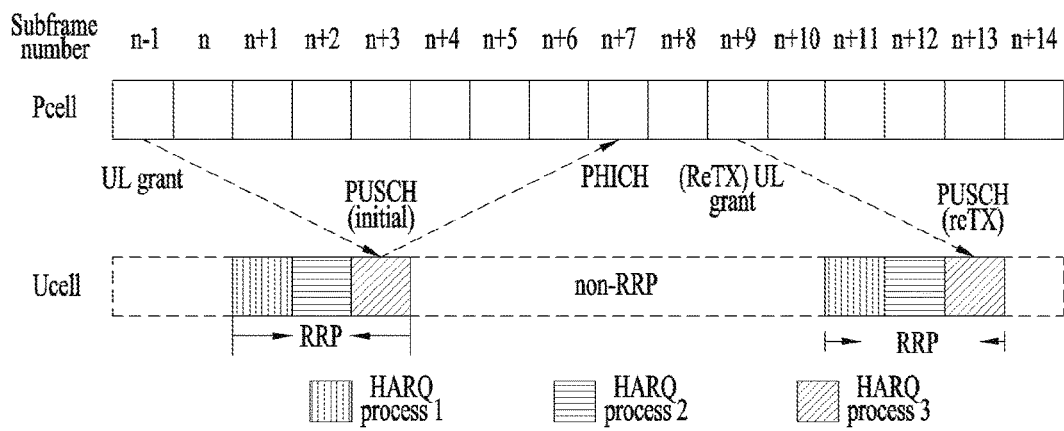
FIG. 16 illustrates a UL HARQ timing according to another embodiment of the present invention.

FIG. 16 illustrates a UL HARQ timing according to another embodiment of the present invention.

In Embodiment 2, in a situation in which a plurality of RRPs is discontinuously configured on a Ucell, a set of SFs having the same order in the RRPs is configured as an SF resource corresponding to one HARQ process. In other words, in Embodiment 2, a set of SFs having the same SF order in each RRP in a situation in which a plurality of RRPs is discontinuously configured on the Ucell is configured as an SF resource corresponding to (re)transmission for the same UL data. For example, a k-th SF in an m-th RRP and a k-th SF in an adjacently configured (m+1)-th RRP configured on the Ucell (in time) may constitute the same HARQ process and retransmission for UL data first transmitted through the k-th SF in the m-th RRP may be performed through the k-th SF in the (m+1)-th RRP. In this case, a UL HARQ timing may be set as follows (according to whether a Pcell is FDD or TDD).

In the case of FDD Pcell: A UL grant for scheduling PUSCH transmission in SF #n is transmitted/received in SF #(n−4) or at a specific timing before SF #(n−4). A PHICH and a retransmission UL grant, corresponding to PUSCH transmission in SF #n, are transmitted/received according to Alt 2-1 or Alt 2-2 described below.

Alt 2-1) A PHICH and a retransmission UL grant, corresponding to PUSCH transmission in SF #n, are transmitted/received in SF #(n+4).

Alt 2-2) The PHICH corresponding to PUSCH transmission in SF #n is transmitted/received in SF #(n+4). If retransmission for PUSCH transmission in SF #n is performed in SF #(n+L), a UL grant for scheduling retransmission is transmitted/received in one SF among SF #(n+L−4) and SF #(n+4) to SF #(n+L−4) and a PHICH corresponding to retransmission is transmitted/received in SF #(n+L+4). Herein, L may be set to a value which is the same as or different from 8, which is an RTT, according to an interval between adjacent RRPs.

In the case of TDD Pcell: A UL grant for scheduling PUSCH transmission in SF #n is transmitted/received in SF #(n−4), at a specific timing before SF #(n−4), in SF #(n−6), or at a specific timing before SF #(n−6). A PHICH and a retransmission UL grant, corresponding to PUSCH transmission in SF #n, are transmitted/received according to Alt 2-3 or Alt 2-4 described below.

Alt 2-3) A PHICH and a retransmission UL grant, corresponding to PUSCH transmission, are transmitted/received in SF #(n+6) or SF #(n+4).

Alt 2-4) A PHICH corresponding to PUSCH transmission in SF #n is transmitted/received in SF #(n+6) or SF #(n+4). If retransmission for PUSCH transmission in SF #n is performed in SF #(n+L), a UL grant for scheduling retransmission is transmitted/received in one SF among SF #(n+L−4) and SF #(n+4) to SF #(n+L−4) or one SF among SF #(n+L−6) and SF #(n+6) to SF #(n+L−6) and a PHICH corresponding to retransmission is transmitted/received in SF #(n+L+6) or SF #(n+L+4). Herein, L may be set to a value which is the same as or different from 10, which is an RTT, according to an interval between adjacent RRPs.

Meanwhile, Embodiment 2 may be generalized in consideration of an RRP length and/or an RTT length (and a combination thereof). That is, a k-th SF in an m-th RRP and a k-th SF in an (m+d)-th RRP configured on a Ucell may constitute the same HARQ process. Based on this, retransmission for UL data first transmitted in the k-th SF in the m-th RRP may be performed in the k-th SF in the (m+d)-th RRP (d>0). For example, the above case is when d=1. If the RRP length and the RTT length are Lrp and Lrt, respectively, d may be set to a minimum integer which is the same as (Lrt/Lrp) or greater than (Lrt/Lrp). If Lrp=4, in the above example, d may be set to 2 for an FDD Pcell and to 2 or 3 for a TDD Pcell.

In Embodiment 2, if an RRP is not configured/set on the Ucell during a predetermined time duration after PUSCH transmission in SF #n, the UE may stop PHICH (NACK) based non-adaptive automatic retransmission. If the UE does not report any HARQ-ACK to a higher layer (e.g. MAC layer) thereof in an SF in which the UE should receive a PHICH, the higher layer may determine that DTX has occurred in the PUSCH or the PHICH. To prevent the higher layer of the UE from determining that a previous PUSCH or a PHICH corresponding to the PUSCH as DTX, the UE may transmit ACK to the higher layer. The higher layer may perform an operation related to HARQ entity (entities). Each HARQ entity manages an operation of a plurality of HARQ processes. The UE may cause the higher layer entity to stop automatic retransmission corresponding to a HARQ process by transmitting ACK to the higher layer in an SF in which the UE should receive the PHICH for PUSCH transmission, regardless of whether the UE receives the PHICH or whether HARQ-ACK carried by the PHICH is NACK or ACK.

(c) Embodiment 3: Retransmission depending on a UL grant (without referring to a PHICH) based on Embodiment 1 is performed.

In Embodiment 3, while Embodiment 1 and a UL HARQ timing corresponding to Embodiment 1 are applied, retransmission is performed depending only on a UL grant without referring to (transmitting) the PHICH. More specifically, according to Embodiment 3, the UE may not be permitted to perform non-adaptive automatic retransmission based only on PHICH (reception) and may be permitted to perform only an adaptive retransmission operation based only on the UL grant (without referring to the PHICH). Such an operation according to Embodiment 3 may be performed by causing the UE to always transmit ACK to a higher layer at a PHICH/UL grant reception timing (regardless of the PHICH). Upon receiving the UL grant, the UE may perform UL data retransmission/initial transmission according to an NDI in the UL grant (regardless of the PHICH).

(d) Embodiment 4: Retransmission depending on a UL grant (without referring to a PHICH) based on Embodiment 2 is performed.

In Embodiment 4, while Embodiment 2 and a UL HARQ timing corresponding to Embodiment 2 are applied, retransmission is performed depending only on a UL grant without referring to (transmitting) a PHICH. In this case, the UE may not be permitted to perform non-adaptive automatic retransmission based only on PHICH (reception) and the UE may be permitted to perform only an adaptive retransmission operation based only on the UL grant (without referring to the PHICH). Such an operation may be performed by causing the UE to always transmit ACK to a higher layer at a PHICH/UL grant reception timing (regardless of the PHICH). Upon receiving the UL grant, the UE may perform UL data retransmission/initial transmission according to an NDI in the UL grant (regardless of the PHICH).

(e) Embodiment 5: A HARQ process number is directly designated through a UL grant (without transmitting a PHICH).

Figure 17:
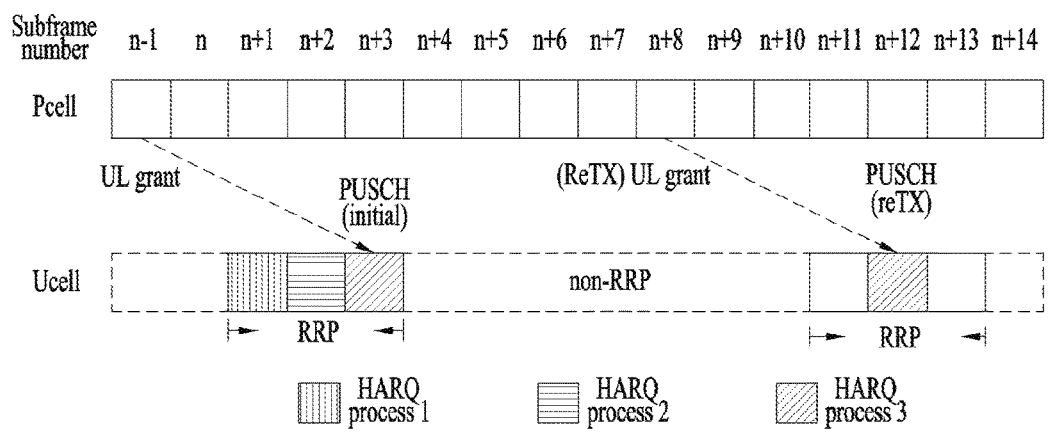
FIG. 17 illustrates a UL HARQ timing according to a further embodiment of the present invention.

FIG. 17 illustrates a UL HARQ timing according to a further embodiment of the present invention.

As described above, a synchronous/channel-non-adaptive HARQ scheme is used on UL in a current communication system. However, in Embodiment 5 of the present invention, an asynchronous HARQ scheme is applied as UL HARQ in consideration of the fact that an RRP may not be configured for a UL transmission timing. For asynchronous UL HARQ, an eNB according to Embodiment 5 directly signals a HARQ process number to the UE through UL grant DCI without configuring/transmitting the PHICH. As opposed to in Embodiments 1 and 3 based on the RTT and Embodiments 2 and 4 based on an SF order, in Embodiment 5 of the present invention, the eNB directly indicates a HARQ process number through DCI at every timing for scheduling a PUSCH. For this reason, arbitrary SFs are combined (without restriction) and may be allocated/configured as one UL HARQ process irrespective of the RTT and SF order. In other words, according to Embodiment 5 of the present invention, arbitrary SFs may be allocated/configured as SFs with UL or DL transmission constituting the same UL HARQ process.

A new field for carrying out Embodiment 5 may be newly added to DCI format 0 and/or 4, which is UL grant DCI. Alternatively, fields of DCI format 0 and/or 4 may be conventionally used for scheduling an Lcell and some of the fields may be replaced with field(s) necessary for carrying out Embodiment 5 to schedule a Ucell. Separately from DCI formats 0 and 4, a new DCI format for scheduling the Ucell may be defined. Hereinafter, DCI obtained by adding field(s) according to Embodiment 5 to DCI format 0/4, DCI obtained by replacing field(s) of DCI format 0/4, or DCI newly defined for scheduling of the Ucell will be collectively referred to as UL grant DCI according to Embodiment 5.

The UL grant DCI according to Embodiment 5 may include a field (HARQp_num) for designating at least a HARQ process number. In a legacy communication system, since a UL transmission/retransmission timing and a corresponding HARQ-ACK transmission/reception timing constituting one HARQ process have been synchronously determined, a field for designating a HARQ process number is not needed in DCI format 0 and/or DCI format 4. In contrast, according to Embodiment 5 of the present invention, since a HARQ-ACK timing and/or a retransmission UL grant timing corresponding to a UL transmission timing has not been synchronized, i.e. not been determined, the UE is not aware of whether a UL grant received thereby is for initial transmission or for retransmission only by a timing at which the UL grant is received. Therefore, the UE is also not aware of which HARQ process the UL grant is associated with. The eNB according to Embodiment 5 of the present invention transmits UL grant DCI including a HARQ process number to the UE so that the UE may be aware of a HARQ process associated with a UL grant received by the UE and/or a PUSCH to be transmitted by the UE. For example, if UL grant DCIs transmitted/received in different DL SFs correspond to the same HARQ process, the UL grant DCIs may have the same HARQ process number in a HARQ process field.

Additionally, the DCI according to Embodiment 5 may further include a field (RV_num) for designating an RV number of a UL data transmission signal. Although legacy DCI format 0/4 includes a 5-bit MCS and RV field (hereinafter, MCS field), the MCS field does not show variation of RVs except in case of $I_{MCS}$=29, $I_{MCS}$=30, or $I_{MCS}$=31 as described with reference to Table 9. Therefore, the UE assumes that RVs of an associated UL grant DCI are cyclically changed in order of 2–>3–>1–>0 starting from RV=0 of UL grant DCI for initial transmission, except in the case in which the MCS field is set to $I_{MCS}$=29, $I_{MCS}$=30, or $I_{MCS}$=31. However, according to Embodiment 5 of the present invention, since a UL HARQ timing is not designated, an order of a UL grant in transmission/retransmission may be unclear even when the UE receives the UL grant. In Embodiment 5 of the present invention, separately from the MCS field or in replacement of the MCS field, the RV number field for explicitly indicating an RV number in UL grant DCI may be included in the UL grant DCI in order to clearly indicate an RV of UL data transmitted by the UE. The eNB may inform the UE of an RV of UL data transmitted by the UE through a PUSCH associated with the same HARQ process using the RV field of the UL grant according to Embodiment 5 of the present invention. The UE transmits UL data of an RV corresponding to a value in the RV field of the UL grant DCI through the PUSCH. This prevents an RV desired by the eNB and an RV transmitted by the UE from being different due to application of asynchronous UL HARQ.

To reduce increase in the size of the UL grant DCI due to configuration of HARQp_num and/or RV_num, a field for designating a cyclic shift of a DMRS (hereinafter, DMRS_cs) may be omitted from DCI format 0/4. Instead, a pre-defined/pre-designated specific DMRS cyclic shift may be used. If the DMRS_cs field is omitted from the UL grant DCI, a DMRS cyclic shift value to be used for actual PUSCH transmission may be implicitly determined based on a resource (e.g. a CCE index) on which the UL grant DCI is transmitted and/or a PUSCH resource (e.g. a PRB index) allocated from the CCE index.

Alternatively, to reduce increase in the size of the UL grant DCI due to configuration of HARQp_num and/or RV_num, a field for requesting aperiodic CSI reporting (hereinafter, aCSI_req) may be omitted from DCI format 0/4. In other words, aperiodic CSI reporting through a Ucell PUSCH may not be permitted.

Additionally, in the case of UL grant DCI for scheduling a Ucell, a DAI field may be omitted. That is, UCI piggy-backing transmission may not be performed through the Ucell PUSCH.

If an RV number is directly indicated through the UL grant, usage of a specific MCS field value (e.g. $I_{MCS}$=29, $I_{MCS}$=30, or $I_{MCS}$=31) which has been used to change an RV in a synchronous HARQ based legacy UL scheduling scheme needs to be newly defined for an asynchronous HARQ based UL scheduling scheme. Therefore, Embodiment 5 of the present invention proposes that the specific MCS field value (e.g. $I_{MCS}$=29, $I_{MCS}$=30, or $I_{MCS}$=31) be used for Alt 5-1) indicating a modulation order (e.g. QPSK, 16-QAM, or 64-QAM) to be applied to PUSCH retransmission, Alt 5-2) triggering PUSCH transmission carrying only aperiodic CSI reporting without a UL-SCH (hereinafter, a-CSI only PUSCH transmission), or Alt 5-3) triggering only aperiodic SRS transmission without scheduling a PUSCH, as described hereinbelow.

Meanwhile, one condition for triggering a-CSI only PUSCH transmission in a legacy UL scheduling scheme is when a specific MCS field value is indicated through the UL grant (e.g. $I_{MCS}$32.29 (i.e. RV number is 1)). However, in Embodiment 5 of the present invention based on asynchronous HARQ, since the RV field and the MCS field are configured in a separate form in the UL grant, it may be necessary to newly set the condition. Therefore, Embodiment 5 of the present invention proposes that the condition for triggering a-CSI only PUSCH transmission be set to the case in which Opt 5-1) the RV field value indicates a specific RV number (e.g. 1) or Opt 5-2) the specific MCS field value (e.g. $I_{MCS}$=29, 30, or 31) based on Alt 5-1 indicates a specific modulation order in addition to Opt 5-1.

For example, in a state in which the specific modulation order is configured only as QPSK, only as 64-QAM, or only as QPSK and 16-QAM, if one thereof is indicated, the UE may perform a-CSI only PUSCH transmission under the assumption that a-CSI only PUSCH transmission is suitable for the triggered condition. Meanwhile, in Opt 5-1 or Opt 5-2, a modulation order applied to actual a-CSI only PUSCH transmission may always be fixed (to, for example, QPSK) regardless of the MCS field value. In Opt 5-2, a modulation order (e.g. QPSK or 16-QAM) indicated by the specific MCS field value (e.g. $I_{MCS}$=29 or 30) based on Alt 5-1 may be applied to actual a-CSI only PUSCH transmission.

Meanwhile, when a-CSI only PUSCH transmission is triggered through the asynchronous HARQ based UL scheduling scheme, the HARQp_num field 1) may be fixed to a specific value (e.g. all bits "0" or all bits are "1"), 2) may indicate a-CSI only PUSCH transmission related information (e.g. modulation order to be applied), or 3) may indicate a-CSI feedback related information (e.g. a-CSI reporting mode and/or a-CSI re-reporting type).

In this case, a UL grant transmission timing for scheduling a PUSCH on a Ucell may be set to all DL (and special) SFs of a scheduling cell configured to schedule the Ucell. For example, when the scheduling cell is an FDD cell, all DL SFs on the cell may be set to the UL grant transmission timing for the Ucell and, when the scheduling cell is a TDD cell, all DL SFs and special SFs on the cell may be set to the UL grant transmission timing for the Ucell. In other words, a UL grant and/or retransmission UL grant associated with one HARQ process may be transmitted/received in arbitrary DL SFs rather than only in specific DL SF(s).

In another embodiment of the present invention, different HARQ operations/schemes may be applied to a case configured as self-CC scheduling and a case configured as cross-CC scheduling. For example, according to another embodiment of the present invention, an asynchronous HARQ scheme (in the form of directly signaling a HARQ process ID (i.e. HARQ process number) through UL grant DCI and/or not referring to a PHICH and not performing non-adaptive retransmission based on the PHICH as in Embodiment 5 of the present invention) may be applied to self-CC scheduling and a synchronous HARQ scheme (in the form of determining the HARQ process ID according to a UL SF timing and/or referring to the PHICH and performing non-adaptive retransmission based on the PHICH as in Embodiments 1/2/3/4) may be applied to cross-CC scheduling.

In Embodiments 1/2/3/4/5 of the present invention, different embodiments may be applied according to an interval between adjacent RRPs on a Ucell (e.g. an interval between RRP start SFs or an interval between RRP end SFs). For example, 1) when the interval between adjacent RRPs is very close (e.g. the interval is less than an RTT), Embodiment 1 may be applied, 2) when the interval between adjacent RRPs is significantly distant (e.g. the interval exceeds a specific threshold value), one of Embodiments 3/4/5 may be applied, and 3) when the interval between adjacent RRPs corresponds to the other case (e.g. the interval exceeds the RTT and is less than the specific threshold value), Embodiment 2 may be applied. As another example, 1) when the interval between adjacent RRPs is less than the specific threshold value, one of Embodiments 1/2 may be applied and when the interval between adjacent RRPs exceeds the specific threshold value, one of Embodiments 3/4 is applied, or 2) when the interval between adjacent RRPs is less than the specific threshold value, one of Embodiments 1/3 may be applied and when the interval between adjacent RRPs exceeds the specific threshold value, one of Embodiments 2/4 may be applied.

According to another embodiment of the present invention, the eNB and the UE may be configured such that different embodiments are applied according to each RRP, an RRP group consisting of a plurality of adjacent RRPs, or a specific time duration (all RRP configured/set in the time duration). For example, the UE and the eNB may be configured such that Embodiment 1/3 or Embodiment 2/4 may be applied to RRP group (time duration) #1 and Embodiment 5 may be applied to RRP group (time duration) #2. Alternatively, the UE and the eNB may be configured such that Embodiments 1/3, Embodiments 2/4, and Embodiment 5 may be applied to RRP group (time duration) #1, RRP group (time duration) #2, and RRP group (time duration) #3, respectively.

Meanwhile, as another method of scheduling PUSCH transmission through an RRP duration (consisting of a plurality of UL SFs) on a Ucell, a scheme of applying UL multi-SF scheduling in the unit of each RRP duration or (in a state in which one RRP duration is divided into a plurality of sub-RRP durations) each sub-RRP duration may be considered. Characteristically, one bundled ACK/NACK response may be generated by performing logical AND operation (for each CW/TB) with respect to a plurality of ACK/NACK responses corresponding to a plurality of UL SFs (PUSCH transmission/reception in the plural SFs) in one multi-SF scheduled RRP or sub-RRP duration. The bundled ACK/NACK response may be transmitted/received using one PHICH resource/index. A UL grant transmission timing for multi-SF scheduling may be set to a UL grant timing corresponding to the first SF (based on Embodiments 1/2/3/4/5 of the present invention) in an RRP or sub-RRP (for multi-SF scheduling). For example, based on first SF #n among a plurality of SFs for multi-SF scheduling, a UL grant timing, which is an SF in which UL grant DCI carrying scheduling information of PUSCHs to be transmitted in a plurality of SFs is to be transmitted, may be determined according to any one of Embodiment 1 to Embodiment 5. A PHICH transmission timing for bundled ACK/NACK may be set (according to Embodiments 1/2/3/4/5 of the present invention) based on the last SF in an RRP or sub-RRP (for multi-SF scheduling). For example, based on the last SF among a plurality of SFs for bundled ACK/NACK, a PHICH timing, which is an SF in which a PHICH carrying bundled ACK/NACK for PUSCHs transmitted in the plural SFs is to be transmitted, may be determined according to any one of Embodiment 1 to Embodiment 5.

Meanwhile, in consideration of the probability that a non-idle SF is present among multi-SF scheduled SFs, the eNB may schedule much more data through multi-SF scheduling than data capable of being stored by a buffer of the UE. That is, the eNB may perform multi-SF scheduling such that the amount of data stored in the buffer of the UE is less than a plurality of multi-SF scheduled SFs or idle SFs among the plural SFs. For example, when the size of the buffer of the UE is 2, the eNB may perform multi-SF scheduling for scheduling 4 SFs. If the UE succeeds in performing PUSCH transmission in the first two consecutive SFs, the UE may not perform PUSCH transmission in two subsequent SFs. In other words, if a plurality of SFs is scheduled by the eNB through multi-SF scheduling, the UE may sequentially use SFs starting from the first SF among the plural SFs and, if there is no other data to be transmitted, the UE may not perform PUSCH transmission in the other SF(s) after the last SF used for data transmission among the plural SFs. In this way, if the eNB schedules a larger number of SFs through multi-SF scheduling than the amount of data in the buffer of the UE, even when SFs which are not in an idle state are present among the SFs, the probability of transmitting all UL data stored in the buffer of the UE may increase.

In UL multi-SF scheduling, based on one UL grant,

Opt X-1) a scheme of transmitting different UL data in each UL SF or

Opt X-2) a scheme of repeatedly transmitting the same UL data in a plurality of UL SFs may be applied to a plurality of UL SFs in one RRP or sub-RRP duration. In Opt X-2, the same UL data having different RVs in each SF may be transmitted. Characteristically, when a UL transmission start timing (depending on a carrier sensing result in the UE) is variably determined, an RV pattern per SF may be configured so that data of an RV having the lowest number/index (i.e. a part corresponding to a systematic bit) may be transmitted in the last SF. For example, UL data having RVs #1/3/2/0 or #3/1/2/0 may be transmitted in SFs #0/1/2/3, respectively, in which SF #3 is the last SF. In this case, a UL transmission end timing may be determined between the eNB and the UE. In addition, even when DL multi-SF scheduling (in the unit of an RRP or a sub-RRP) for a Ucell is performed, the schemes of Opt X-1/X-2 may be identically/similarly applied.

Meanwhile, when Opt X-1 based UL multi-SF scheduling based on an asynchronous UL HARQ operation/scheme (according to Embodiment 5 of the present invention) is applied, each of an NDI and an RV is signaled through UL grant DCI one by one (as in legacy single-SF scheduling) and the NDI/RV may be commonly applied to a plurality of UL SFs corresponding to a UL grant. Alternatively, only one NDI may be commonly signaled/applied to a plurality of UL SFs and the RV may be individually signaled/applied per UL SF. Conversely, the NDI may be individually signaled/applied per UL SF and only one RV may be commonly signaled/applied to a plurality of UL SFs. As another method, UL multi-SF scheduling may be applied only to first transmitted data and a legacy single-SF scheduling scheme may be applied to retransmitted data. In this case, NDI and RV field/signaling in the UL grant DCI for UL multi-SF scheduling may be omitted. If the NDI and RV field in the UL grant DCI for UL multi-SF scheduling is omitted, the UE may assume that data scheduled by the UL grant DCI always corresponds to first transmission and has a fixed RV value (e.g. #0).

In addition, a HARQ process number for UL multi-SF scheduling may be allocated using the following scheme. First, assuming that the number of UL SFs to be applied to UL multi-SF scheduling (corresponding to one UL grant) is N, N HARQ process numbers corresponding to the N UL SFs may be configured through higher layer signaling such as RRC signaling. In this case, HARQp_num field/signaling in the UL grant DCI may be omitted. As another method, only one HARQ process number may be signaled through the UL grant DCI (as in the legacy single-SF scheduling scheme) and N consecutive HARQ process numbers (which are less than a maximum HARQ process number and are cyclic) including this one HARQ process number value may be sequentially allocated to the N UL SFs.

Additionally, the number, N, of UL SFs to be applied to UL multi-SF scheduling may be configured through higher layer signaling such as RRC signaling or may be dynamically indicated through L1 signaling such as a PDCCH (i.e. UL grant DCI). Meanwhile, all of the proposals of the present invention related to (asynchronous UL HARQ based) UL multi-SF scheduling may also be identically/similarly applied to a DL multi-SF scheduling scheme.

Meanwhile, when an aperiodic RRP consisting of UL SFs is considered, a Ucell may be regarded as the same as a UL carrier of an FDD SCell and, when an RRP consisting of DL SFs is considered, the Ucell may be regarded as the same as a DL carrier of the FDD Scell. Therefore, UL grant DCI for scheduling the Ucell may not include/signal a DAI when a Pcell operates based on an FDD scheme, whereas the UL grant DCI may include/signal the DAI when the Pcell operates based on a TDD scheme. Likewise, even in the case of DL grant DCI for scheduling the Ucell, whether the DL grant DCI includes/signals the DAI may be configured according to a duplex scheme (i.e. FDD or TDD) of the Pcell.

This may be generalized such that a DCI format for scheduling the Ucell is configured to apply a DCI format (a field and a field size configured in the DCI format) defined in FDD when the Pcell is an FDD cell and apply a DCI format defined in TDD when the Pcell is a TDD cell. For example, a HARQ process number field in the DL grant DCI for scheduling the Ucell may be configured as 3 bits when the Pcell is the FDD cell and as 4 bits when the Pcell is the TDD cell. As another example, DL grant DCI format 2B/2C/2D for scheduling the Ucell may not include aperiodic SRS request field/signaling when the Pcell is the FDD cell and may include aperiodic SRS request field/signaling when the Pcell is the TDD cell.

<UL Multi-SF Scheduling for PUSCH Transmission in Ucell>

Hereinafter, detailed embodiments for UL multi-SF scheduling mentioned above will be described.

Particularly, embodiments of UL multi-SF scheduling for enabling UL (PUSCH) scheduling with respect to all 10 SFs (based on a radio frame) on the Ucell are proposed. Characteristically, in consideration of the case in which the Ucell is configured to perform cross-CC scheduling from a cell operating by a TDD scheme or in consideration of SFs (e.g. SFs #0/1/5/6) in which a DL duration can be commonly secured with respect to all UL/DL configurations as a UL grant/PHICH transmission timing, the following embodiments of UL grant/PHICH timing based multi-SF scheduling may be applied.

1) Embodiment U1

U1-A. UL grant/PHICH transmission/reception for simultaneous multi-SF scheduling of 5 SFs after 4 SFs (or 4 ms) starting from SFs #0/5 may be performed through SFs #0/5, respectively.

2) Embodiment U2

U2-A. UL grant/PHICH transmission/reception for single-SF scheduling of one SF after 4 SFs (or 4 ms) starting from SFs #0/5 may be performed through SFs #0/5, respectively.

U2-B. UL grant/PHICH transmission/reception for simultaneous multi-SF scheduling of 4 SFs after 4 SFs (or 4 ms) starting from SFs #1/6 may be performed through SFs #1/6, respectively.

3) Embodiment U3

U3-A. UL grant/PHICH transmission/reception for simultaneous multi-SF scheduling of 2 SFs after 4 SFs (or 4 ms) starting from SFs #0/5 may be performed through SFs #0/5, respectively.

U3-B. UL grant/PHICH transmission/reception for simultaneous multi-SF scheduling of 3 SFs after 5 SFs (or 5 ms) starting from SFs #1/6 may be performed through SFs #1/6, respectively.

4) Embodiment U4

U4-4. UL grant/PHICH transmission/reception for simultaneous multi-SF scheduling of 3 SFs 4 after SFs (or 4 ms) starting from SFs #0/5 may be performed through SFs #0/5, respectively.

U4-B. UL grant/PHICH transmission/reception for simultaneous multi-SF scheduling of 2 SFs after 6 SFs (or 6 ms) starting from SFs #1/6 may be performed through SFs #1/6, respectively.

According to embodiments other than Embodiments U1 to U4, the following embodiments of UL multi-SF scheduling may be considered in order to raise degree of freedom of UL scheduling of the eNB.

1) Embodiment U5

U5-A. UL grant/PHICH transmission/reception for simultaneous multi-SF scheduling of 5 SFs after 4 SFs (or 4 ms) starting from SFs #0/5 may be performed through SFs #0/5, respectively.

U5-B. UL grant/PHICH transmission/reception for simultaneous multi-SF scheduling of 4 SFs after 4 SFs (or 4 ms) starting from SFs #1/6 may be performed through SFs #1/6, respectively.

U5-C. UL grant/PHICH transmission/reception for simultaneous multi-SF scheduling of 3 SFs after 4 SFs (or 4 ms) starting from SFs #2/7 may be performed through SFs #2/7, respectively.

U5-D. UL grant/PHICH transmission/reception for simultaneous multi-SF scheduling of 2 SFs after 4 SFs (or 4 ms) starting from SFs #3/8 may be performed through SFs #3/8, respectively.

U5-E. UL grant/PHICH transmission/reception for simultaneous multi-SF scheduling of one SF after 4 SFs (or 4 ms) starting from SFs #4/9 may be performed through SFs #4/9, respectively.

2) Embodiment U6

U6-A. UL grant/PHICH transmission/reception for simultaneous multi-SF scheduling of N SFs after 4 SFs (or 4 ms) starting from SFs #0/1/2/3/4/5/6/7/8/9 may be performed through SFs #0/1/2/3/4/5/6/7/8/9, respectively.

U6-B. In U6-A, N may be set to 2, 3, 4, or 5.

In Embodiment U1 to Embodiment U6 described above, SF #n corresponding to a UL grant/PHICH transmission timing may be configured by applying a predetermined SF offset k so that SF #(n+k) may be applied to the embodiments. That is, in Embodiment U1 to Embodiment U6, the predetermined SF offset k may be applied to SF #n corresponding to the UL grant/PHICH transmission timing in the form of SF #(n+k) to determine a multi-SF scheduling timing and object SFs. In TDD, Embodiment U1 to Embodiment U6 may be applied only to SFs in which a DL duration is present according to UL/DL configuration.

<DL Multi-SF Scheduling for PDSCH Transmission in Ucell>

To perform DL multi-SF scheduling for enabling DL (PUSCH) scheduling with respect to all 10 SFs (based on a radio frame) on the Ucell, the following embodiments of DL grant timing based multi-SF scheduling may be applied in a similar manner to the above-described embodiments of UL multi-SF scheduling.

1) Embodiment D1

D1-A. DL grant transmission/reception for simultaneous multi-SF scheduling of 5 SFs including/after SFs #0/5 starting from SFs #0/5 may be performed through SFs #0/5, respectively.

2) Embodiment D2

D2-A. DL grant transmission/reception for single-SF scheduling of SFs #0/5 may be performed through SFs #0/5, respectively.

D2-B. DL grant transmission/reception for simultaneous multi-SF scheduling of 4 SFs including/after SFs #1/6 starting from SFs #1/6 may be performed through SFs #1/6, respectively.

According to embodiments other than embodiment D1 and Embodiment D2, the following embodiments of DL multi-SF scheduling may be considered in order to raise degree of freedom of DL scheduling of the eNB.

1) Embodiment D3

D3-A. DL grant transmission/reception for simultaneous multi-SF scheduling of 5 SFs including/after SFs #0/5 starting from SFs #0/5 may be performed through SFs #0/5, respectively.

D3-B. DL grant transmission/reception for simultaneous multi-SF scheduling of 4 SFs including/after SFs #1/6 starting from SFs #1/6 may be performed through SFs #1/6, respectively.

D3-C. DL grant transmission/reception for simultaneous multi-SF scheduling of 3 SFs including/after SFs #2/7 starting from SFs #2/7 may be performed through SFs #2/7, respectively.

D3-D. DL grant transmission/reception for simultaneous multi-SF scheduling of 2 SFs including/after SFs #3/8 starting from SFs #3/8 may be performed through SFs #3/8, respectively.

D3-E. DL grant transmission/reception for simultaneous multi-SF scheduling of one SF including/after SFs #4/9 starting from SFs #4/9 may be performed through SFs #4/9, respectively.

2) Embodiment D4

D4-A. DL grant transmission/reception for simultaneous multi-SF scheduling of N SFs including/after SFs #0/1/2/3/4/5/6/7/8/9 starting from SFs #0/1/2/3/4/5/6/7/8/9 may be performed through SFs #0/1/2/3/4/5/6/7/8/9, respectively.

D4-B. In D4-A, N may be set to 2, 3, 4, or 5.

In Embodiment D1 to Embodiment D4, SF #n corresponding to a DL grant timing may be configured by applying a predetermined SF offset k so that SF #(n+k) may be applied to the embodiments. That is, in Embodiment D1 to Embodiment D4, the predetermined SF offset k may be applied to SF #n corresponding to the DL grant timing in the form of SF #(n+k) to determine a multi-SF scheduling timing and object SFs. In TDD, Embodiment D1 to Embodiment D6 may be applied only to SFs in which a DL duration is present according to UL/DL configuration.

While the above-described embodiments of the present invention have been given by way of example when an Lcell and a Ucell are carrier-aggregated as a serving cell for a UE, the embodiments may also be applied when the Ucell alone is configured as the serving cell for the UE. Further, the above-described embodiments may be applied to scheduling for the Lcell as well as scheduling for the Ucell and may be applied to scheduling for an arbitrary cell regardless of cell type.

Figure 18:
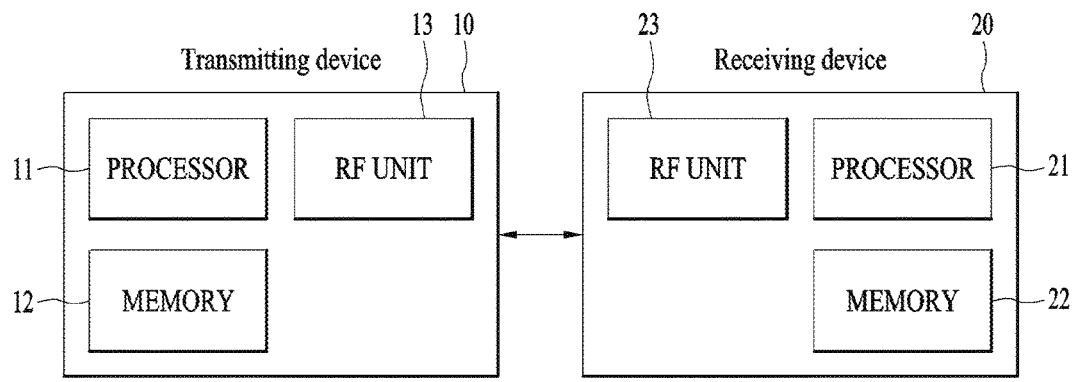
FIG. 18 is a block diagram illustrating elements of a transmitting device 10 and a receiving device 20 for implementing the present invention.

FIG. 18 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor according to the present invention may control the eNB RF unit to transmit DL grant DCI according to one of Embodiment D1 to Embodiment D4 of the present invention. The eNB processor may control the eNB RF unit to transmit UL grant DCI according to any one of Embodiment U1 to Embodiment U6 of the present invention. The UE processor according to the present invention may control the UE RF unit to receive the DL grant DCI according to any one of Embodiment D1 to Embodiment D4 of the present invention. The UE processor may control the UE RF unit to receive the UL grant DCI according to any one of Embodiment U1 to Embodiment U6 of the present invention.

The eNB process according to the present invention may control the eNB RF unit to perform UL grant transmission, PUSCH reception, (retransmission or initial) UL grant and/or PHICH transmission according to any one of UL HARQ timing embodiments of the present invention. The eNB processor may generate the UL grant DCI according to one of the UL HARQ timing embodiments of the present invention. The eNB processor may generate legacy UL grant DCI for scheduling an Lcell and generate the UL grant DCI according to the UL grant DCI according to any one of the embodiments of the present invention for scheduling a Ucell. The eNB processor may control the eNB RF unit to transmit the legacy UL grant DCI for scheduling an Lcell and control the eNB RF unit to transmit the UL grant DCI for scheduling the Ucell according to any one of the embodiments of the present invention.

The UE processor according to the present invention may control the UE RF unit to perform UL grant reception, PUSCH transmission, (retransmission or initial) UL grant and/or PHICH reception according to any one of the UL HARQ timing embodiments of the present invention. The UE processor may receive or detect the UL grant DCI according to one of UL HARQ timing embodiments of the present invention. The eNB processor may control the eNB RF unit to receive the legacy UL grant DCI for scheduling the Lcell and control the eNB RF unit to receive the UL grant DCI for scheduling the Ucell according to any one of the embodiments of the present invention. The UE processor may detect a UL grant for the Lcell by attempting to decode a PDCCH according to a legacy UL grant DCI format for scheduling the Lcell and detect a UL grant for the Ucell by attempting to decode the PDCCH according to a UL grant DCI format according to any one of the embodiments of the present invention for scheduling the Ucell.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method of transmitting an uplink signal by a user equipment (UE), the method comprising:
    receiving uplink (UL) grant downlink control information (DCI) for a specific cell; and
    transmitting UL data on the specific cell based on the UL grant DCI,
    wherein, if the specific cell is a cell configured in an unlicensed band, the UL grant DCI includes a hybrid automatic repeat request (HARQ) process number field, and
    wherein, if the specific cell is a cell configured in a licensed band, the UL grant DCI does not include the HARQ process number field.

2. The method according to claim 1, wherein, if the specific cell is the cell configured in the unlicensed band, the UL grant DCI further includes a redundancy version (RV) field in addition to a 5-bit modulation and coding scheme field.

3. The method according to claim 1, wherein
    wherein the UL grant DCI is received in a time resource unit n and transmission of the UL data is performed in a time resource unit n+k (where k is a positive integer), and the method further comprises:
    receiving retransmission UL grant DCI for the specific cell in a time resource unit n' (where n' is an integer greater than n+k) and performing retransmission for the UL data according to the retransmission UL grant DCI in a time resource unit n'+k.

4. The method according to claim 1, wherein, if the specific cell is the cell configured in the unlicensed band, the specific cell is one of a first type cell on which a reference signal used for channel measurement is aperiodically received or a second type cell on which the reference signal used for channel measurement is periodically received.

5. A user equipment (UE) for transmitting an uplink signal, the UE comprising:
    a radio frequency (RF) unit configured to transmit or receive a signal, and
    a processor configured to control the RF unit, the processor configured to:
        control the RF unit to receive uplink (UL) grant downlink control information (DCI) for a specific cell; and
        control the RF unit to transmit UL data on the specific cell based on the UL grant DCI,
    wherein, if the specific cell is a cell configured in an unlicensed band, the UL grant DCI includes a hybrid automatic repeat request (HARQ) process number field, and
    wherein, if the specific cell is a cell configured in a licensed band, the UL grant DCI does not include the HARQ process number field.

6. The UE according to claim 5, wherein, if the specific cell is the cell configured in the unlicensed band, the UL grant DCI further includes a redundancy version (RV) field in addition to a 5-bit modulation and coding scheme field.

7. The UE according to claim 5,
    wherein, the UL grant DCI is received in a time resource unit n and transmission of the UL data is performed in a time resource unit n+k (where k is a positive integer),
    wherein the processor controls the RF unit to receive retransmission UL grant DCI for the specific cell in a time resource unit n' (where n' is an integer greater than n+k) and controls the RF unit to perform retransmission for the UL data according to the retransmission UL grant DCI in a time resource unit n'+k.

8. The UE according to claim 5, wherein, if the specific cell is the cell configured in the unlicensed band, the specific cell is one of a first type cell on which a reference signal used for channel measurement is aperiodically received or a second type cell on which the reference signal used for channel measurement is periodically received.

9. A method of receiving an uplink signal by a base station (BS), the method comprising:
    transmitting uplink (UL) grant downlink control information (DCI) for a specific cell to a user equipment (UE); and
    receiving UL data on the specific cell based on the UL grant DCI from the UE,
    wherein, if the specific cell is a cell configured in an unlicensed band, the UL grant DCI includes a hybrid automatic repeat request (HARQ) process number field, and
    wherein, if the specific cell is a cell configured in a licensed band, the UL grant DCI does not include the HARQ process number field.

10. A base station (BS) for receiving an uplink signal, the BS comprising:
    a radio frequency (RF) unit configured to transmit or receive a signal, and
    a processor configured to control the RF unit, the processor configured to:
        control the RF unit to transmit uplink (UL) grant downlink control information (DCI) for a specific cell to a user equipment; and
        control the RF unit to receive UL data on the specific cell based on the UL grant DCI from the UE,
    wherein, if the specific cell is a cell configured in an unlicensed band, the processor is configured to generate the UL grant DCI to include a hybrid automatic repeat request (HARQ) process number field, and
    wherein, if the specific cell is a cell configured in a licensed band, the UL grant DCI does not include the HARQ process number field.

11. The BS according to claim 10, wherein, if the specific cell is the cell configured in the unlicensed band, the processor is configured to generate the UL grant DCI to further include a redundancy version (RV) field in addition to a 5-bit modulation and coding scheme field.

12. The BS according to claim 10, wherein, if the specific cell is the cell configured in the unlicensed band, the specific cell is one of a first type cell on which a reference signal used for channel measurement is aperiodically transmitted or a second type cell on which the reference signal used for channel measurement is periodically transmitted.

* * * * *